United States Patent
Okajima

(10) Patent No.: US 7,192,098 B2
(45) Date of Patent: Mar. 20, 2007

(54) BICYCLE RIM

(75) Inventor: Shinpei Okajima, Izumi (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/430,396

(22) Filed: May 7, 2003

(65) Prior Publication Data

US 2004/0222690 A1    Nov. 11, 2004

(51) Int. Cl.
B60B 1/02    (2006.01)
B60B 21/06    (2006.01)

(52) U.S. Cl. .......................................... 301/58; 301/61
(58) Field of Classification Search ................ 301/55, 301/58–59, 61, 95.101, 95.104, 95.107, 95.108, 301/104, 67; 29/894.33–894.333
See application file for complete search history.

(56) References Cited

U.S. PATENT DOCUMENTS

| | | | |
|---|---|---|---|
| 382,658 A * | 5/1888 | Nickerson .............. 301/95.105 |
| 395,523 A | 1/1889 | Taylor |
| 416,190 A * | 12/1889 | Terry .......................... 301/58 |
| 446,189 A | 2/1891 | Overman |
| 452,649 A | 5/1891 | Powell |
| 486,995 A * | 11/1892 | Weinmann et al. ........... 301/67 |
| 521,385 A | 6/1894 | Mosley |
| 556,124 A * | 3/1896 | Wolff ......................... 301/58 |
| 574,139 A * | 12/1896 | Curry .......................... 301/56 |
| 651,981 A * | 6/1900 | Singer ......................... 301/67 |
| 657,435 A * | 9/1900 | Minshall ..................... 301/67 |
| 737,007 A * | 8/1903 | Newton ....................... 301/58 |
| 1,212,803 A * | 1/1917 | Murray ........................ 301/67 |
| 1,484,844 A | 2/1924 | Olle |
| 1,635,849 A * | 7/1927 | Isguerra ....................... 301/58 |
| 1,722,855 A * | 7/1929 | Alred et al. ................. 301/67 |
| 2,937,905 A * | 5/1960 | Altenburger ................. 301/58 |
| 4,583,787 A * | 4/1986 | Michelotti ................... 301/58 |
| 4,793,659 A | 12/1988 | Oleff et al. |
| 5,499,864 A | 3/1996 | Klein et al. |
| 5,651,591 A | 7/1997 | Mercat et al. |
| 6,024,413 A * | 2/2000 | Dixon et al. ................. 301/58 |
| 6,155,651 A | 12/2000 | Mizata et al. |
| 6,213,562 B1 | 4/2001 | Muraoka et al. |
| 6,224,165 B1 | 5/2001 | Mercat et al. |
| 6,257,676 B1 | 7/2001 | Lacombe et al. |

(Continued)

FOREIGN PATENT DOCUMENTS

| EP | 0714791 A1 | 6/1996 |
|---|---|---|
| EP | 0715001 A1 | 6/1996 |
| EP | 1134096 | 9/2001 |
| EP | 1167078 A1 | 1/2002 |
| EP | 1207053 | 5/2002 |

(Continued)

Primary Examiner—Jason R. Bellinger
(74) Attorney, Agent, or Firm—Global IP Counselors, LLP

(57) ABSTRACT

A bicycle rim includes a tire attachment portion a spoke attachment portion and a plurality of reinforcement members fixedly coupled to the spoke attachment portion at attachment openings to effectively increase the thickness of the spoke attachment portion at the attachment openings. Each reinforcement member includes a rim facing surface that contacts the rim, an exterior facing surface facing and a through opening extending between the rim facing surface and the exterior facing surface that is aligned with one of the attachment openings. Each of the reinforcement members is preferably welded to the spoke attachment portion. Each of the reinforcement members preferably has a maximum overlapping dimension overlapping the spoke attachment portion as measured from an outer peripheral edge to a respective one of the attachment openings with the maximum overlapping dimension being at least half as large as a maximum transverse dimension of the attachment openings.

22 Claims, 27 Drawing Sheets

U.S. PATENT DOCUMENTS

| | | |
|---|---|---|
| 6,367,883 B1 | 4/2002 | Chen |
| 6,402,256 B1 | 6/2002 | Mercat |
| 6,431,658 B1 * | 8/2002 | Nakajima et al. ............. 301/59 |
| 6,443,533 B2 * | 9/2002 | Lacombe et al. ...... 301/95.104 |
| 6,715,844 B2 * | 4/2004 | Dietrich ....................... 301/58 |
| 6,736,462 B1 * | 5/2004 | Okajima ...................... 301/58 |
| 2002/0014293 A1 | 2/2002 | Passarotto |
| 2004/0222691 A1 * | 11/2004 | Okajima ..................... 301/58 |

FOREIGN PATENT DOCUMENTS

| | | |
|---|---|---|
| EP | 1236586 | 9/2002 |
| EP | 1260382 | 11/2002 |
| EP | 1486352 | 12/2004 |
| JP | 639502 U | 5/1994 |
| JP | 7501022 A | 2/1995 |
| TW | 313981 | 8/1997 |

* cited by examiner

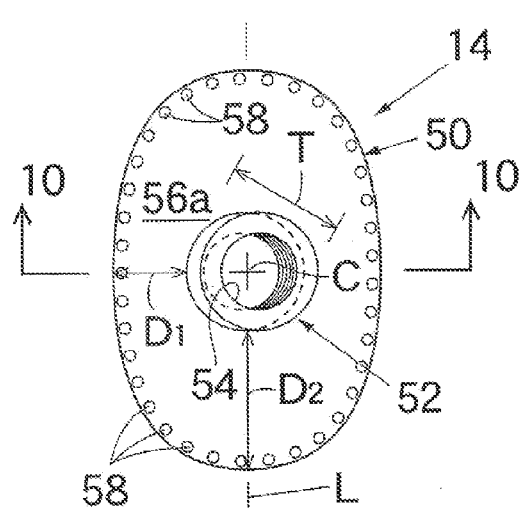
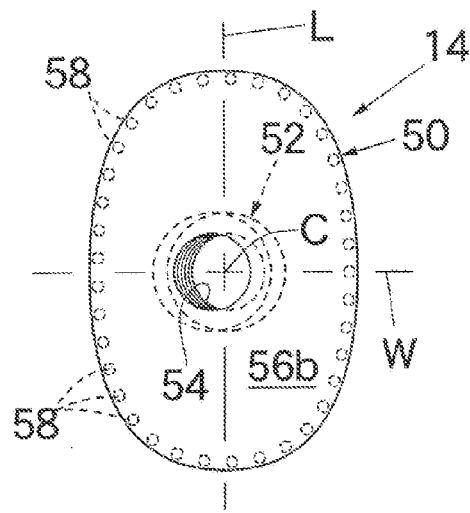
Fig. 5  Fig. 6
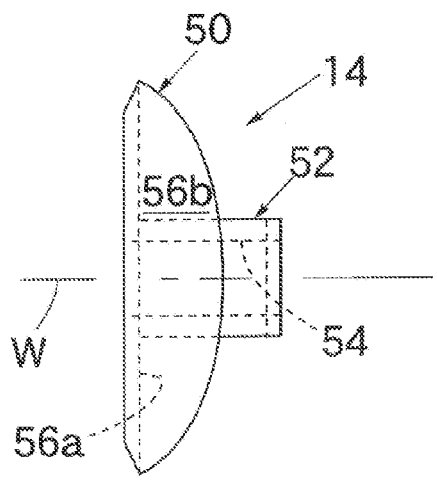
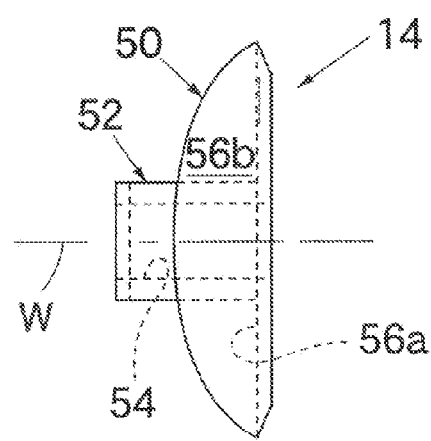
Fig. 7  Fig. 8
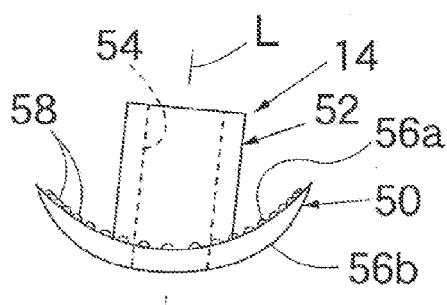
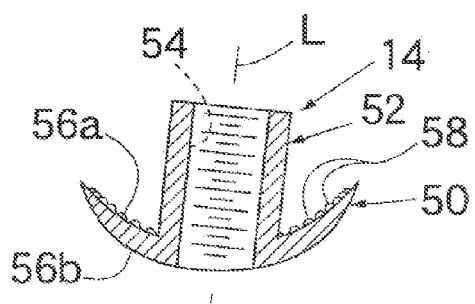
Fig. 9  Fig. 10

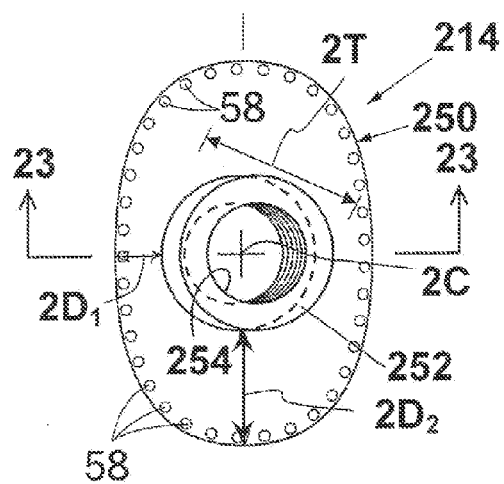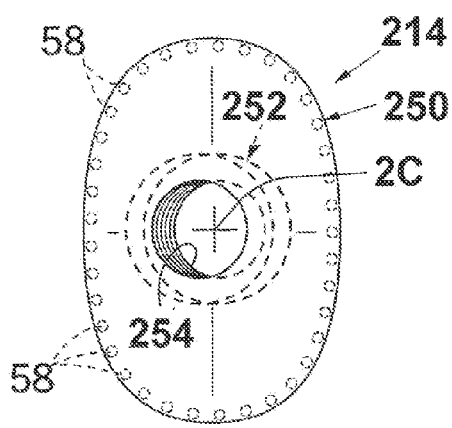
Fig. 18   Fig. 19
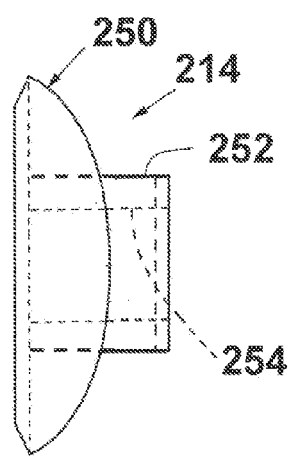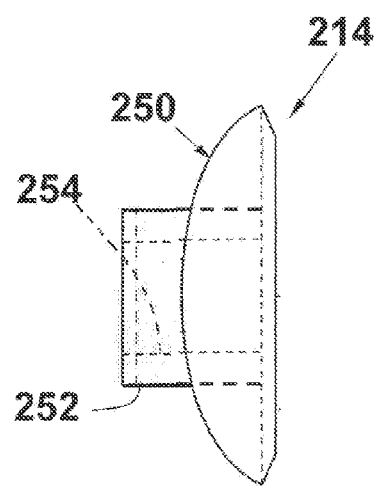
Fig. 20   Fig. 21
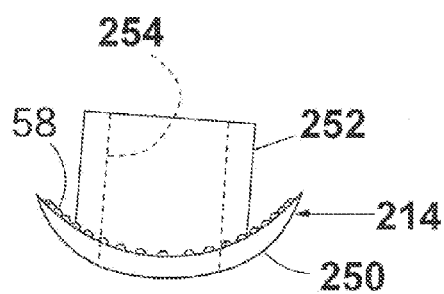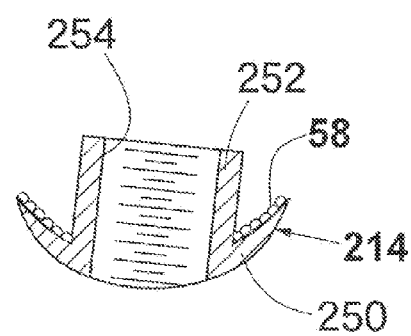
Fig. 22   Fig. 23

BICYCLE RIM

BACKGROUND OF THE INVENTION

1. Field of the Invention

This invention generally relates to a bicycle wheel. More specifically, the present invention relates to a reinforced rim of the bicycle wheel.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

The above types of wheels have been designed for use with tube tires or tubeless tires. Typically, tubeless tire wheels have an annular seal arranged to seal the spoke attachment openings of the rim. Rims designed for tube tires also often have an annular member covering the spoke attachments. In any case, these typical types of wheels can be expensive and complicated to manufacture and assemble. Moreover, these typical wheels are not always as strong and lightweight, as desired. Furthermore, with these typical wheels it can be difficult, complicated and/or expensive to replace a spoke or spokes.

In view of the above, it will be apparent to those skilled in the art from this disclosure that there exists a need for an improved bicycle rim for a bicycle wheel. This invention addresses this need in the art as well as other needs, which will become apparent to those skilled in the art from this disclosure.

SUMMARY OF THE INVENTION

One object of the present invention is to provide a rim for a bicycle wheel that is relatively strong yet relatively lightweight.

Another object of the present invention is to provide a rim that is relatively simple and inexpensive to manufacture and assemble.

The foregoing objects can basically be attained by providing a bicycle rim comprising an annular tire attachment portion adapted to have a tire mounted thereon, an annular spoke attachment portion fixedly coupled with the tire attachment portion and a plurality of reinforcement members fixedly coupled to the spoke attachment portion. The spoke attachment portion includes a plurality of circumferentially spaced attachment openings with each opening having a central axis. The reinforcement members are fixedly coupled to the spoke attachment portion at the attachment openings to effectively increase the thickness of the spoke attachment portion of the rim at the attachment openings. Each of the reinforcement members is welded to the spoke attachment portion. Each reinforcement member includes a rim facing surface, an exterior facing surface and a through opening. The rim facing surfaces contact an outer surface of the spoke attachment portion of the rim. The exterior facing surfaces face in an opposite direction from the rim facing surfaces. The through openings extend between the rim facing surfaces and the exterior facing surfaces and are aligned with one of the attachment openings.

The foregoing objects can also basically be attained by providing a bicycle rim comprising an annular tire attachment portion adapted to have a tire mounted thereon, an annular spoke attachment portion fixedly coupled with the tire attachment portion and a plurality of reinforcement members fixedly coupled to the spoke attachment portion. The spoke attachment portion includes a plurality of circumferentially spaced attachment openings with each opening having a central axis. The reinforcement members are fixedly coupled to the spoke attachment portion at the attachment openings to effectively increase the thickness of the spoke attachment portion of the rim at the attachment openings. Each of the reinforcement members has a maximum overlapping dimension overlapping the annular spoke attachment portion as measured from an outer peripheral edge to a respective one of the attachment openings with the maximum overlapping dimension being at least half as large as a maximum transverse dimension of the attachment openings. Each reinforcement member includes a rim facing surface, an exterior facing surface and a through opening. The rim facing surfaces contact an outer surface of the spoke attachment portion of the rim. The exterior facing surfaces face in an opposite direction from the rim facing surfaces. The through openings extend between the rim facing surfaces and the exterior facing surfaces and are aligned with one of the attachment openings.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2(*b*) is an enlarged, partial cross-sectional view of the bicycle wheel illustrated in FIG. 1 with the tire removed for the purpose of illustration, as seen along section line 2(*b*)—2(*b*) of FIG. 1;

FIG. 5 is an enlarged, outside elevational view (i.e. outer radial view) of one of the reinforcement members of the bicycle rim illustrated in FIGS. 1–4;

FIG. 6 is an inside elevational view (i.e. inner radial view) of the reinforcement member illustrated in FIG. 5;

FIG. 7 is a side (axial) elevational view of the reinforcement member illustrated in FIGS. 5 and 6;

FIG. 8 is an opposite side (axial) elevational view of the reinforcement member illustrated in FIGS. 5–7;

FIG. 9 is an end (circumferential) elevational view of the reinforcement member illustrated in FIGS. 5–8;

FIG. 10 is a cross-sectional view of the reinforcement member illustrated in FIGS. 5–9, as see along section line 10—10 of FIG. 5;

FIG. 18 is an enlarged, outside elevational view (i.e. outer radial view) of one of the reinforcement members of the bicycle rim illustrated in FIGS. 15–17;

FIG. 19 is an inside elevational view (i.e. inner radial view) of the reinforcement member illustrated in FIG. 18;

FIG. 20 is a side (axial) elevational view of the reinforcement member illustrated in FIGS. 18 and 19;

FIG. 21 is an opposite side (axial) elevational view of the reinforcement member illustrated in FIGS. 18–20;

FIG. 22 is an end (circumferential) elevational view of the reinforcement member illustrated in FIGS. 18–21;

FIG. 23 is a cross-sectional view of the reinforcement member illustrated in FIGS. 18–22, as see along section line 23—23 of FIG. 18;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
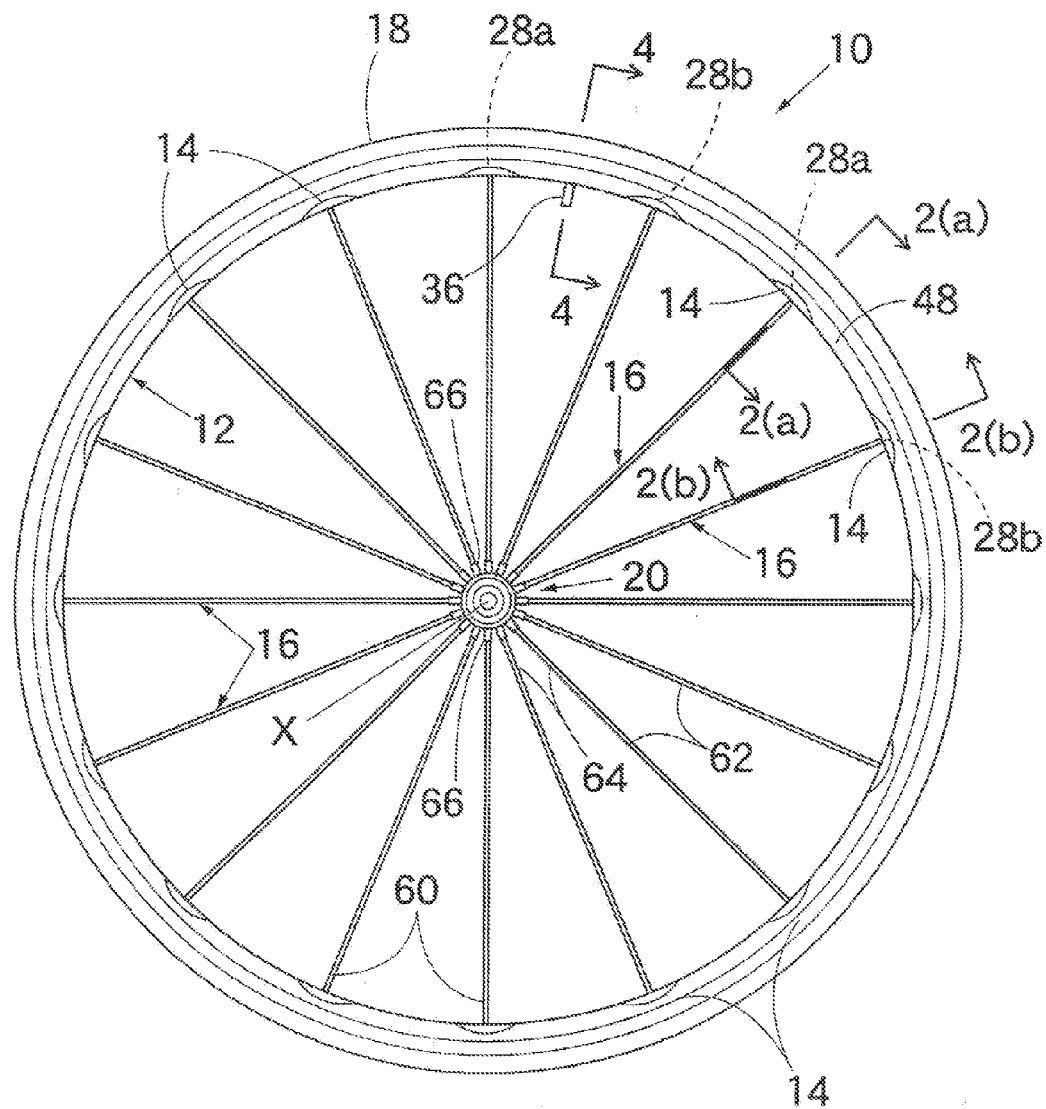
FIG. 1 is a side elevational view of a bicycle wheel with a reinforced rim in accordance with a first preferred embodiment of the present invention.

Referring initially to FIG. 1, a bicycle wheel 10 is illustrated in accordance with a first embodiment of the present invention. The bicycle wheel 10 utilizes a reinforced rim 12 that has a plurality of reinforcement members 14 fixedly coupled thereto in accordance with the present invention. When the reinforcement members 14 are fixedly coupled to the rim 12, the reinforcement members 14 form part of the rim 12. Thus, the bicycle wheel 10 basically includes the rim 12 with the reinforcement members 14, a plurality of spokes 16, a pneumatic tire 18 and a center hub 20. The tire 18 can include a tube (not shown) and a separate tire, or can be a tubeless type tire, as discussed below in more detail.

In the illustrated embodiment, the spokes 16 are radial spokes that connect the hub 20 to the rim 12. Also, in the illustrated embodiment, the hub 20 is a front hub (i.e. the hub 20 does not include one or more sprockets) that utilizes sixteen radial spokes 16 coupled to the rim 12 at equally spaced circumferential locations as seen in FIG. 1. Of course, it will be apparent to those skilled in the art from this disclosure that bicycle wheel 10 could use a modified rim and/or hub in order to accommodate different spoking arrangements (e.g. all tangential spokes, some tangential spokes and some radial spokes, etc.) without departing from the scope of the present invention. It will also be apparent to those skilled in the art from this disclosure that bicycle wheel 10 could use a modified rim and/or hub in order to accommodate one or more sprockets, as needed and/or desired. Moreover, it will be apparent to those skilled in the art from this disclosure that the bicycle wheel 10 could use a modified rim and/or hub in order to accommodate fewer or more spokes 16 if needed and/or desired. In any case, the spokes 16 are preferably coupled to the annular rim 12 in circumferentially spaced arrangement.

The rim 12 is an annular member designed for rotation about a center axis X. The rim 12 is constructed of a substantially rigid material, such as those materials, which are well known in the art. For example, the rim 16 can be constructed of any suitable metallic material, such as plated steel, stainless steel, aluminum, magnesium or titanium, as well as other non-metallic materials, such as a carbon fiber composite. Preferably, the rim 12 is constructed of aluminum. The construction of the rim 12 will be discussed in more detail below.

Referring to FIGS. 1–4, the rim 12 is substantially circular as seen in side elevation (FIG. 1), and basically includes an outer annular portion 24, an inner annular portion 26 with a plurality of attachment openings 28a and 28b, and the plurality of the reinforcement members 14 fixedly coupled to the inner annular portion 26 at the attachment openings 28a and 28b to reinforce the rim 12. The outer annular portion 24 is a tire attachment portion, while the inner annular portion 26 is a spoke attachment portion. Basically, the rim 12 has a uniform cross-sectional profile as seen in FIGS. 2(a) and 2(b), except for the absence of material at various openings formed in the rim 12 as described herein.

The inner annular portion 26 is fixedly coupled with the outer annular portion 24 to form an annular hollow area A. The inner annular portion 26 preferably has a U-shaped cross-section with the ends of the U-shaped inner annular portion 26 coupled to opposite axial sides of the outer annular portion 24 to form the annular hollow area A. The outer annular portion 24 also preferably has a substantially U-shaped cross-section with the free ends of the substantially U-shaped outer annular portion designed to retain the tire 18.

The outer annular portion 24 and the inner annular portion 26 are preferably integrally formed together as a one-piece unitary aluminum member to form a constant cross-sectional shape about the entire circumference of the outer and inner annular portions 24 and 26 of the rim 12 in a relatively conventional manner. For example, the outer and inner annular portions 24 and 26 can be constructed by extruding a length of aluminum with the cross-sectional shape illustrated in FIGS. 2–4, and then bending the length of aluminum into a circular shape, and then welding the ends of the length of aluminum together. The attachment openings 28a and 28b can be punched or drilled in a conventional manner before or after welding the free ends of the length of aluminum together.

The reinforcement members 14 are preferably formed as separate aluminum members from the outer and inner annular portions 24 and 26 by casting, machining and/or any other suitable manufacturing technique. The reinforcement members 14 are fixedly coupled to the inner annular portion 26 of the rim 12, preferably by welding in order to reinforce the rim 12, as discussed below in more detail. The outer and inner annular portions 24 and 26 each have a symmetrical cross-sectional shape relative to a center plane P that is perpendicular to the center axis X of the wheel 10. However, the rim 12 is not completely (i.e. not exactly or perfectly) symmetrical relative to the center plane P due to the arrangements of the attachment openings 28a and 28b and the reinforcement members 14, as discussed below in more detail. Thus, the rim 12 preferably has a substantially symmetrical shape relative to the center plane P of the wheel 10.

Referring still to FIGS. 1–4, the outer annular portion 24 basically includes a pair of annular side sections 30 and an annular outer bridge or connecting section 32. The annular connecting section 32 extends between the annular side sections 30 to form a substantially U-shaped tire receiving recess as seen in cross-section (FIGS. 2(a)–4). The annular side sections 30 are annular plate shaped members that are preferably at least about 1.1 millimeters thick, and that form a pair of annular tire supporting surfaces and a pair of annular braking surfaces in a conventional manner. The tire supporting surfaces are opposed annular surfaces that face each other toward the center plane P. The tire supporting surfaces have annular ribs formed at their free ends to retain beads of the tire 18 in a conventional manner. The annular braking surfaces face outwardly away from the center plane P to engage conventional rim brakes. The annular side sections 30 are fixedly coupled to the inner annular portion 26 at a pair of annular reinforcing beads B. The beads B are thicker than both the inner annular portion 26 and the annular side sections 30. Moreover, the beads B divide the inner annular portion 26 from the annular side sections 30.

Figure 4:
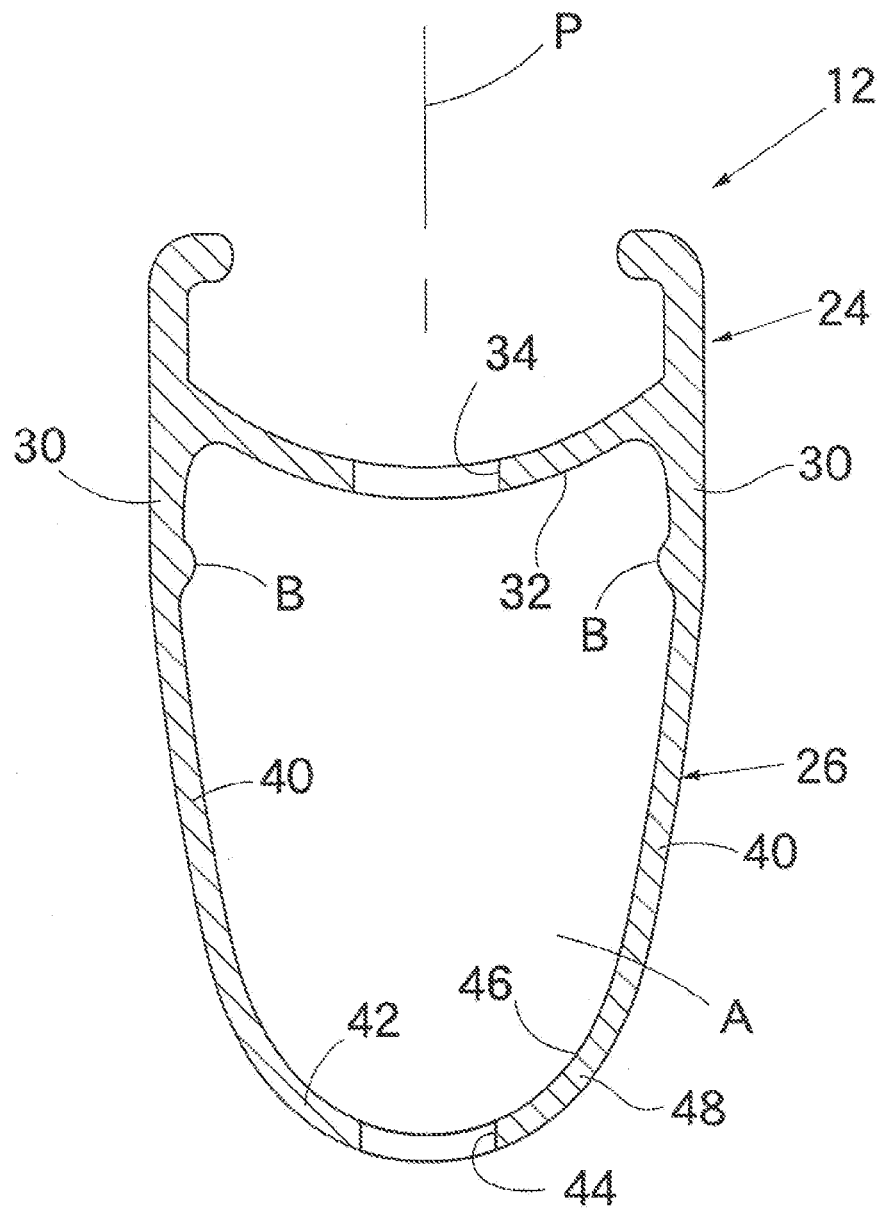
FIG. 4 is an enlarged, partial cross-sectional view of the bicycle wheel illustrated in FIGS. 1–3 with the tire removed for the purpose of illustration, as seen along section line 4—4 of FIG. 1.
Figure 11:
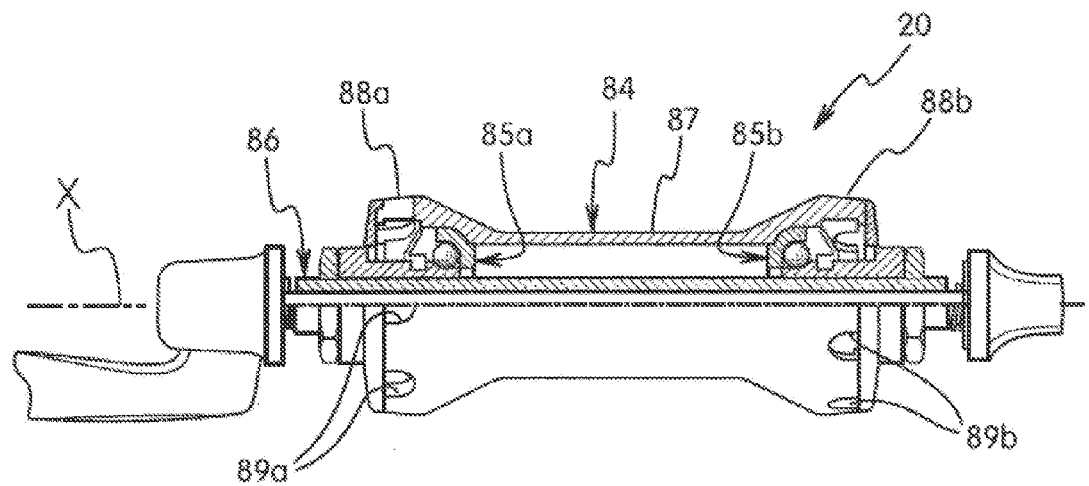
FIG. 11 is an enlarged, top plan view of the hub of the bicycle wheel illustrated in FIG. 1 with portions shown in cross-section for the purpose of illustration.
Figure 12:
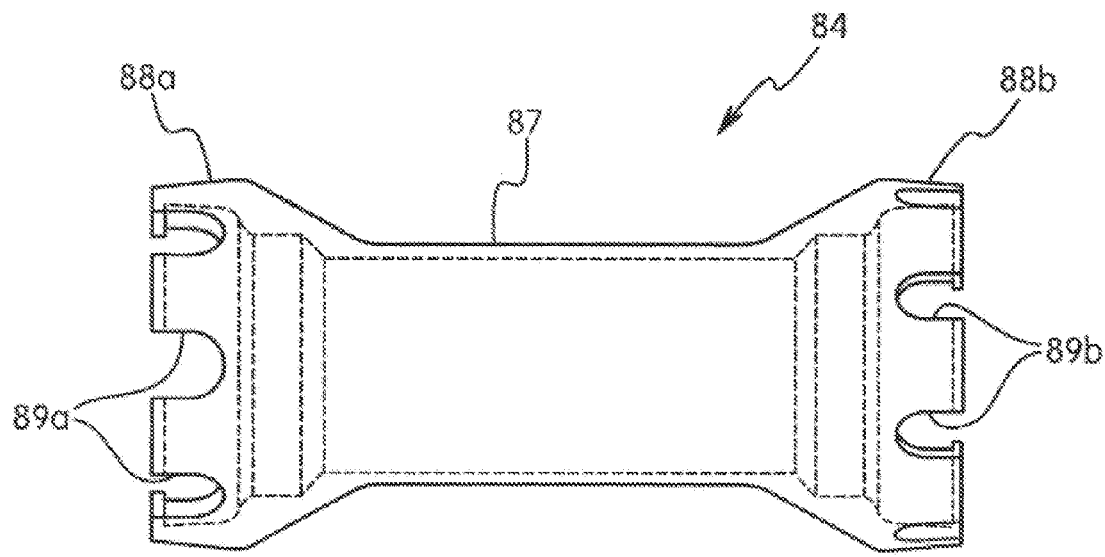
FIG. 12 is an enlarged, top plan view of the hub body of the hub illustrated in FIG. 11.
Figure 13:
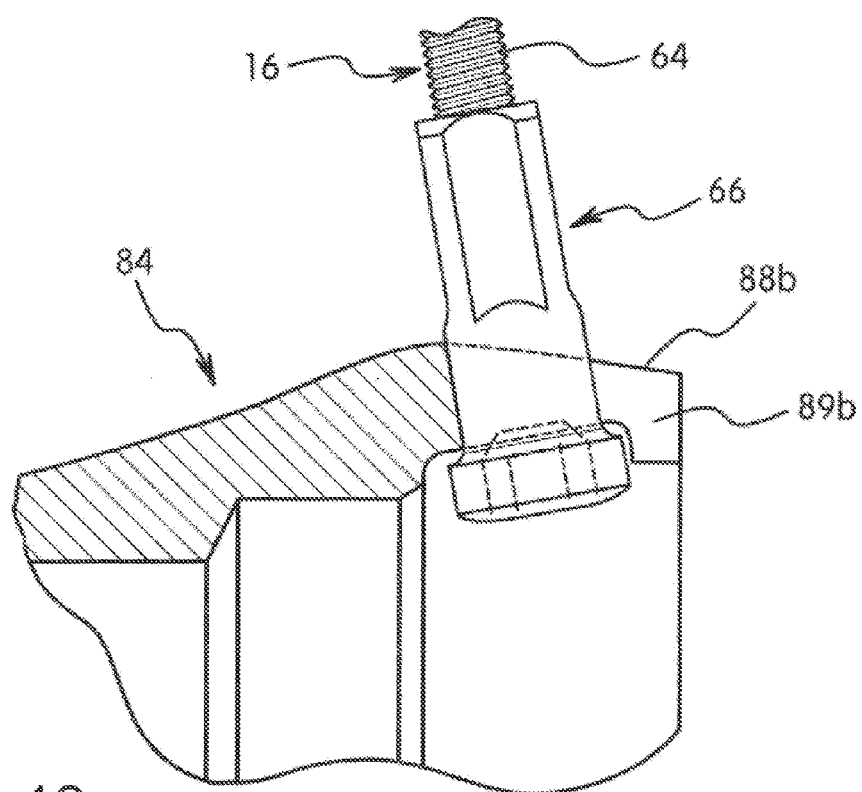
FIG. 13 is a partial, enlarged cross-sectional view of a portion of the hub body illustrated in FIGS. 11 and 12 with a spoke nipple arranged in a spoke hole.
Figure 14:
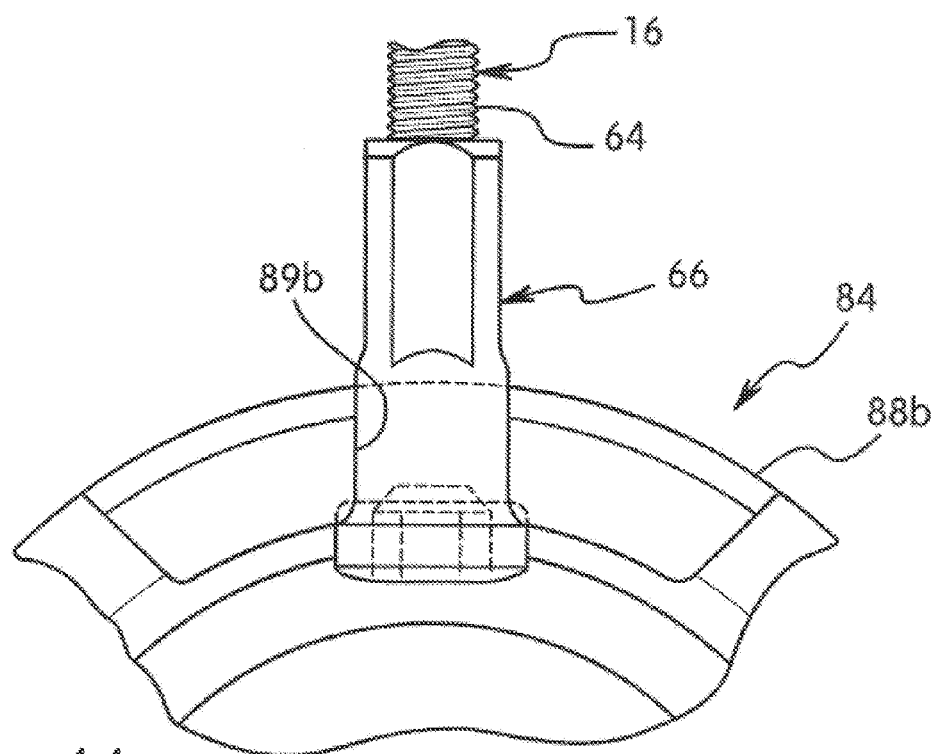
FIG. 14 is a right side elevational view of the portion of the hub body and spoke nipple illustrated in FIG. 13.
Figure 15:
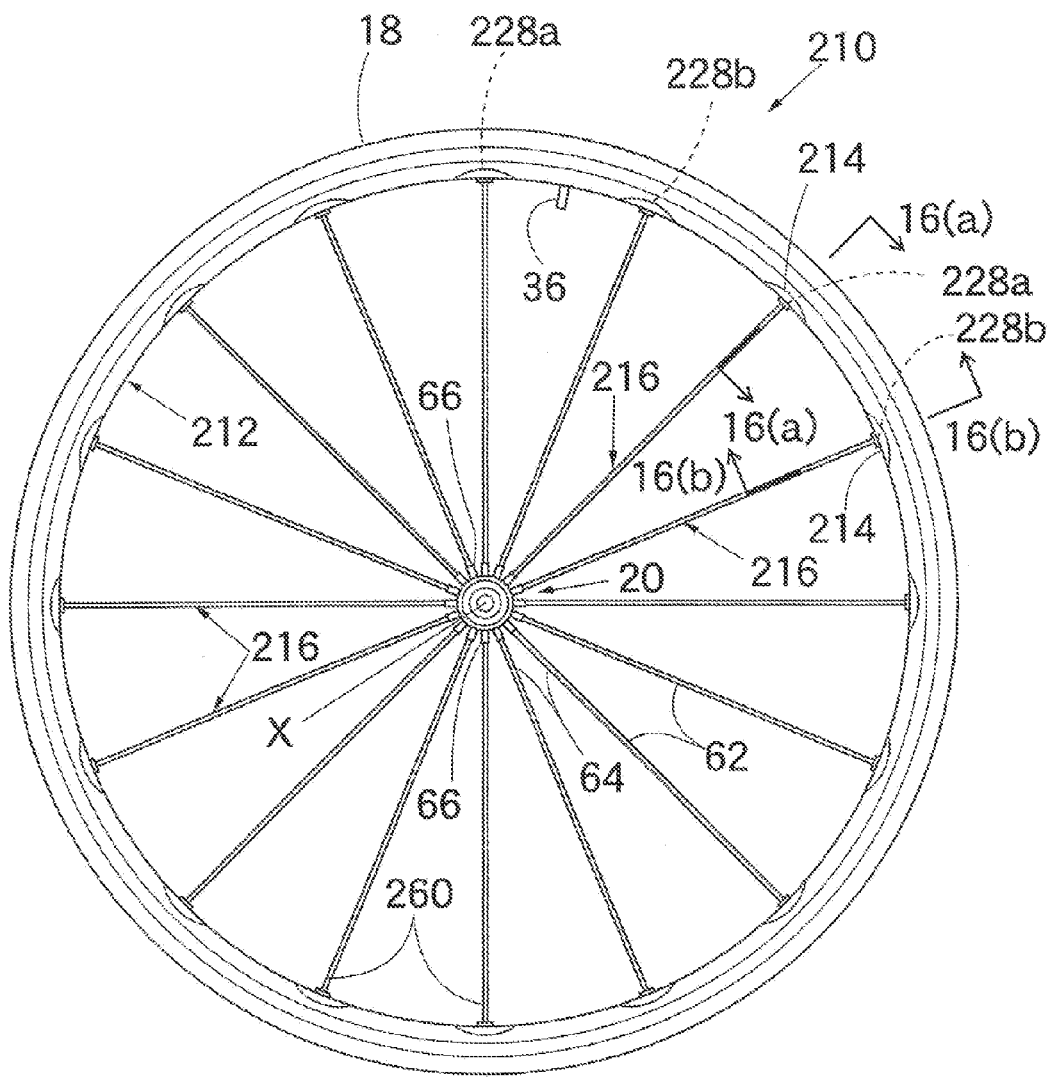
FIG. 15 is a side elevational view of a bicycle wheel with a reinforced rim in accordance with a second preferred embodiment of the present invention.
Figure 16A:
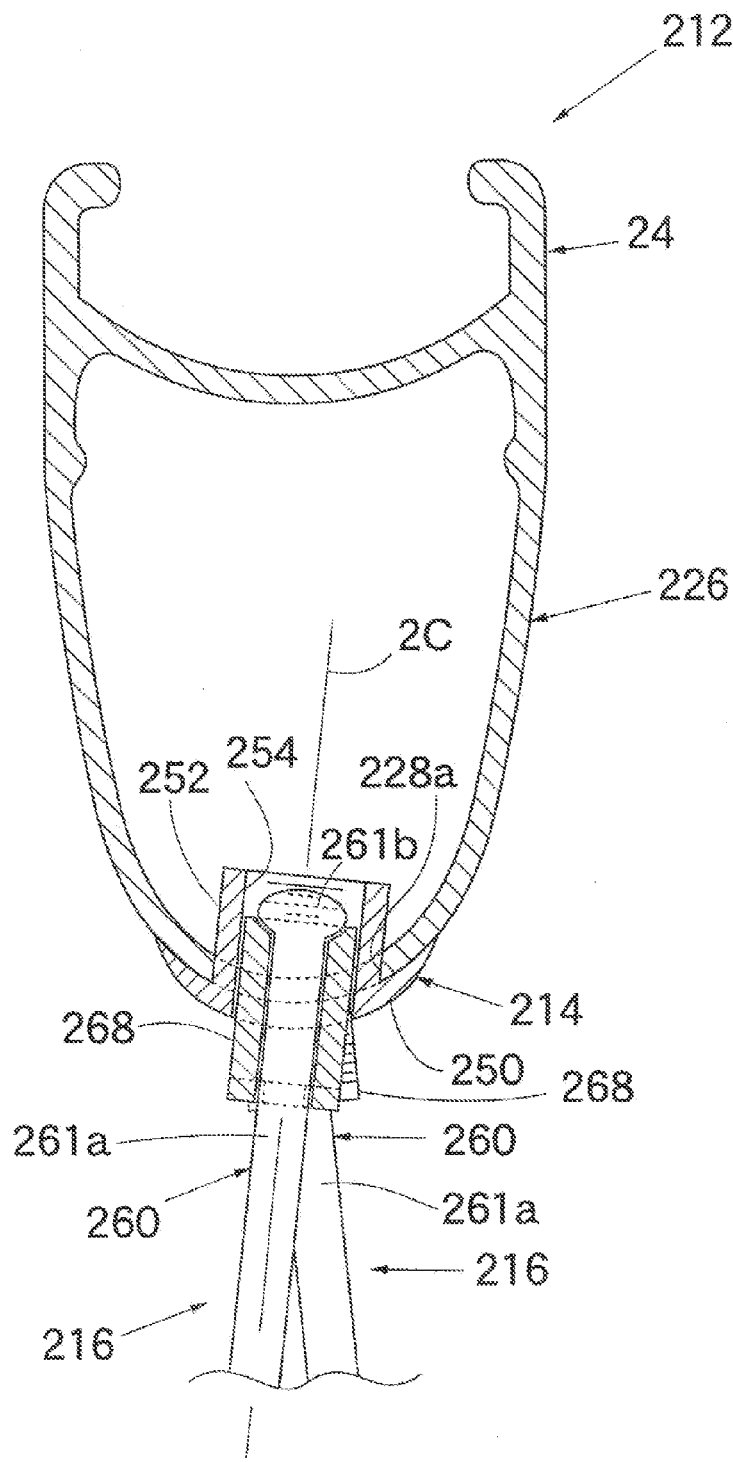
FIG. 16(a) is an enlarged, partial cross-sectional view of the bicycle wheel illustrated in FIG. 15 with the tire removed for the purpose of illustration, as seen along section line 16(a)—16(a) of FIG. 15.
Figure 16B:
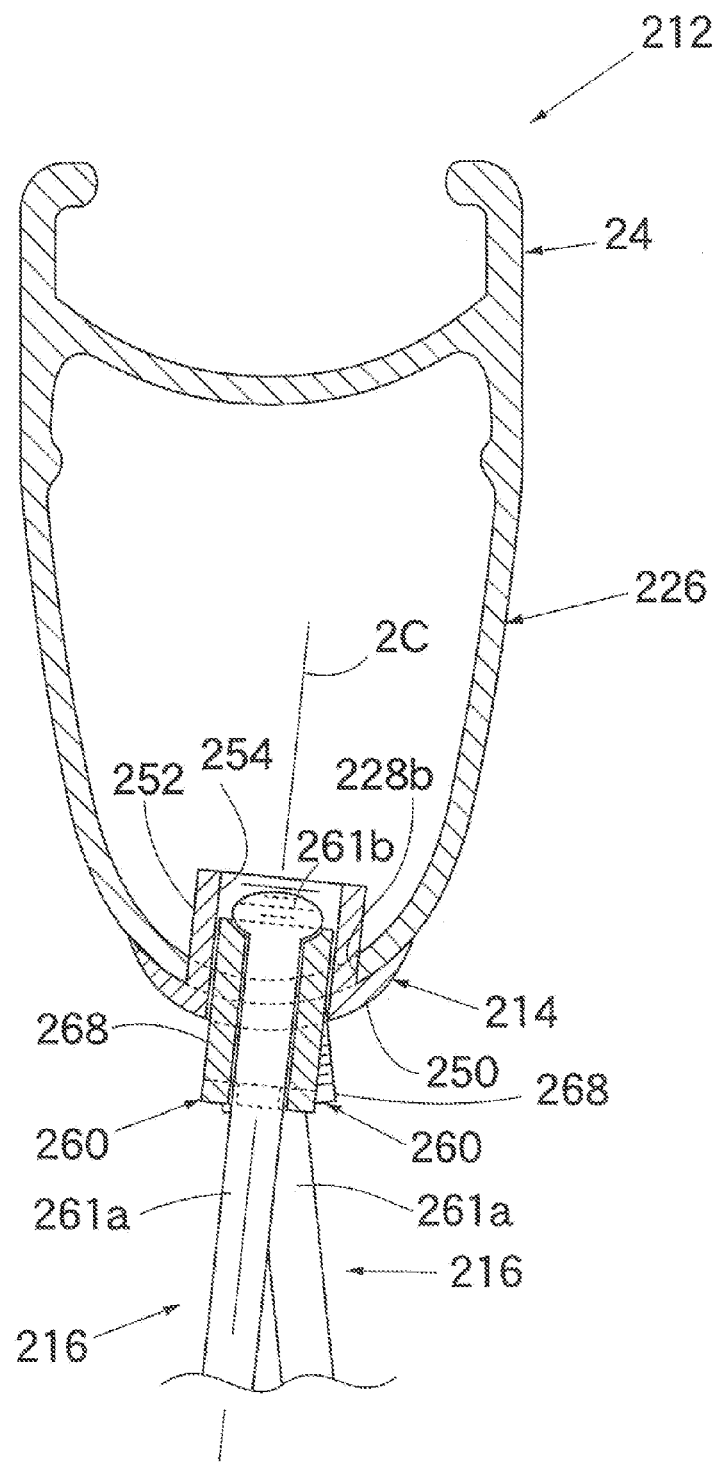
FIG. 16(b) is an enlarged, partial cross-sectional view of the bicycle wheel illustrated in FIG. 15 with the tire removed for the purpose of illustration, as seen along section line 16(b)—16(b) of FIG. 15.
Figure 17:
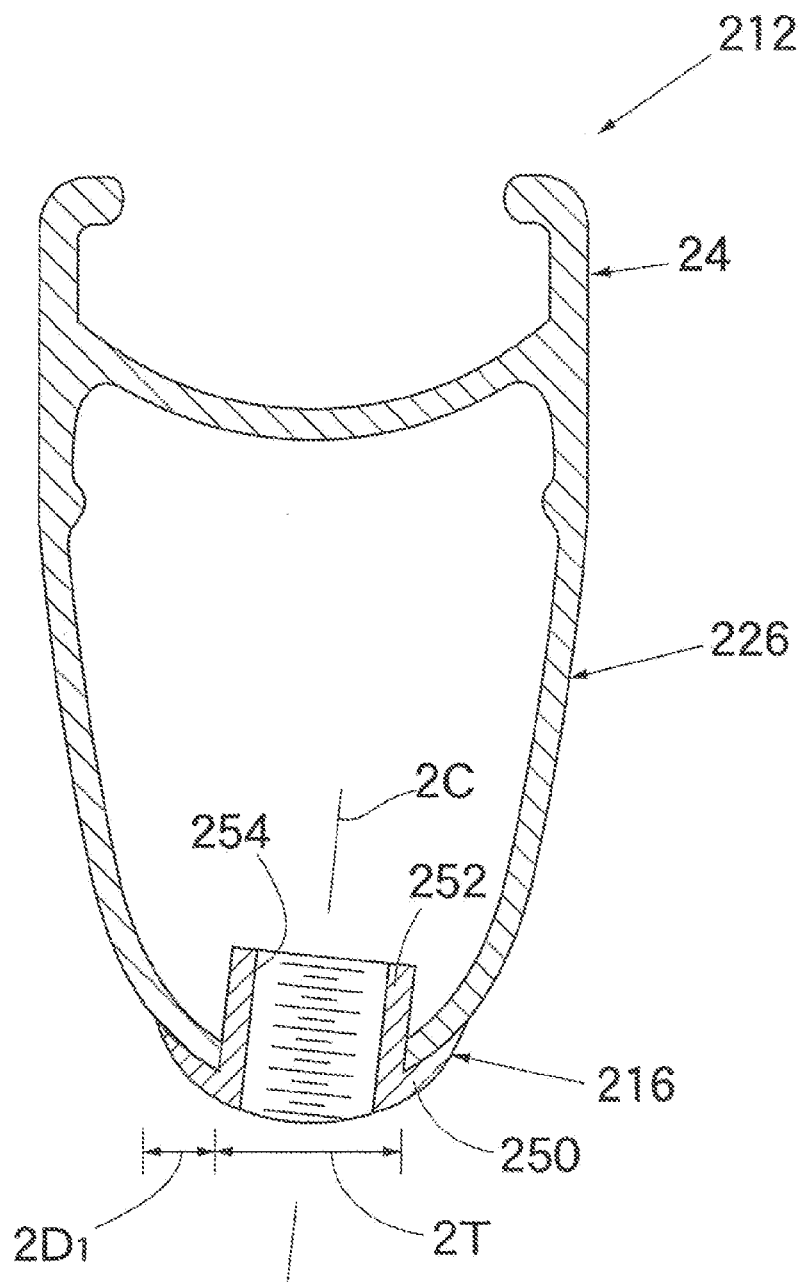
FIG. 17 is an enlarged, partial cross-sectional view of the bicycle wheel illustrated in FIGS. 15, 16(a) and 16(b) with the tire and spokes removed for the purpose of illustration, as seen along section line 16(a)—16(a) of FIG. 15.
Figure 24:
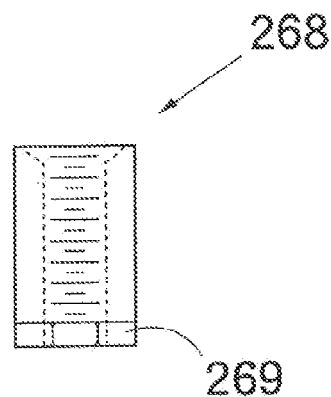
FIG. 24 is a side (axial) elevational view of one of the adapters of the spokes illustrated in FIGS. 15 and 16.
Figure 25:
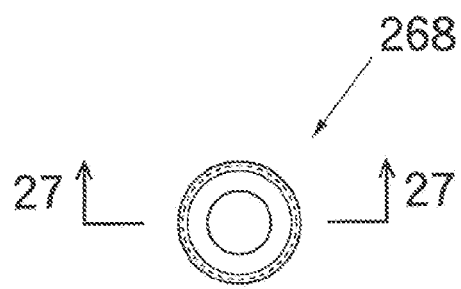
FIG. 25 is outside elevational view (i.e. outer radial view) of the adapter illustrated in FIG. 24.
Figure 26:
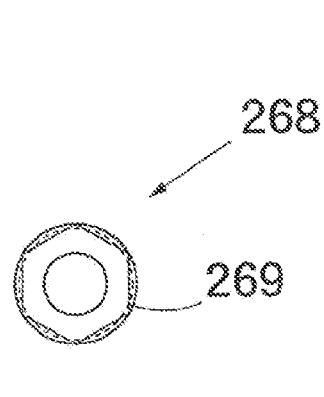
FIG. 26 inside elevational view (i.e. inner radial view) of the adapter illustrated in FIGS. 24 and 25.
Figure 27:
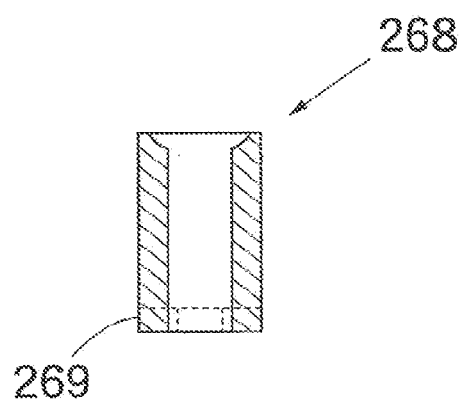
FIG. 27 is a cross-sectional of the adapter illustrated in FIGS. 24–26, as seen along section line 27—27 of FIG. 25.
Figure 28:
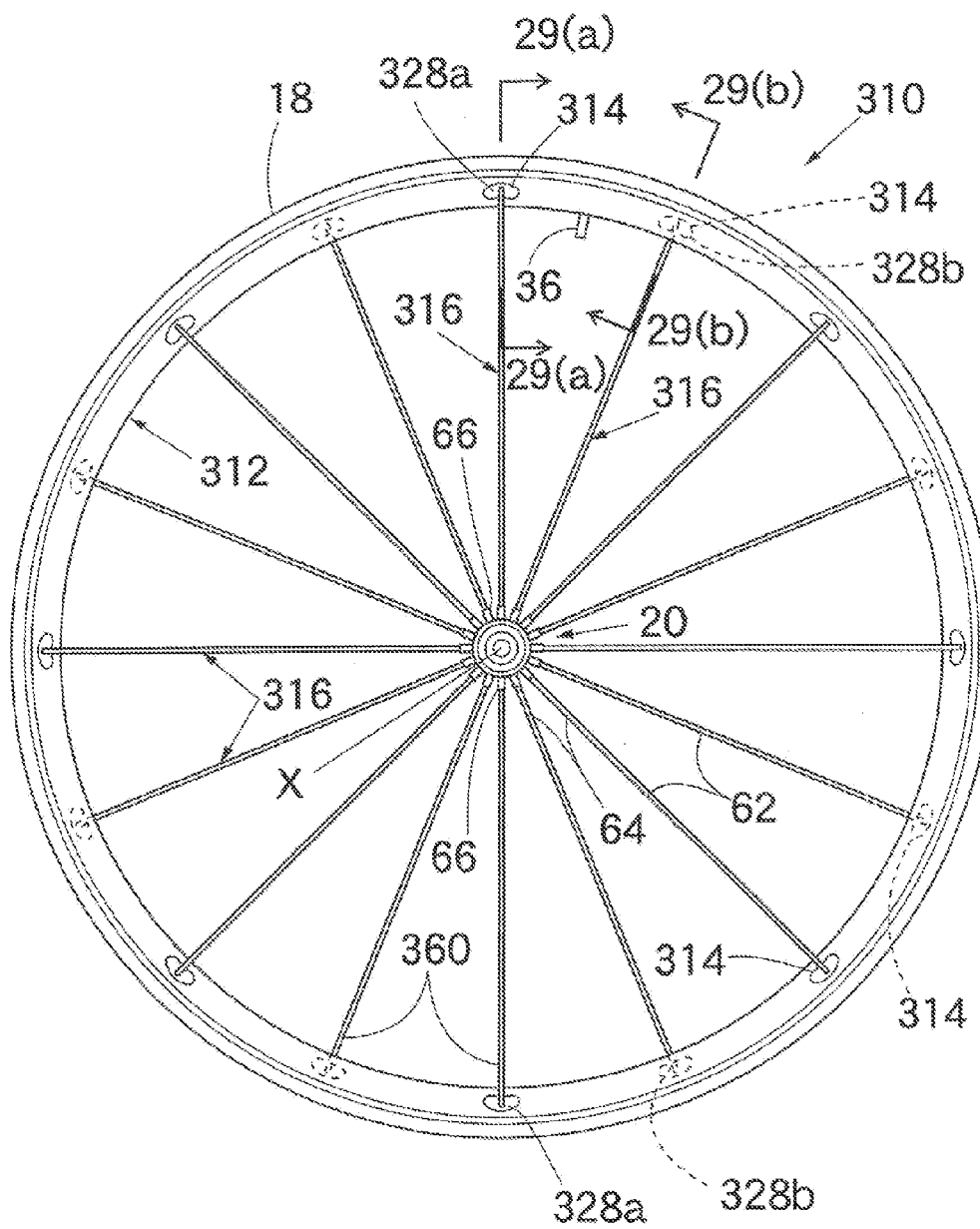
FIG. 28 is a side elevational view of a bicycle wheel with a reinforced rim in accordance with a third preferred embodiment of the present invention.
Figure 29A:
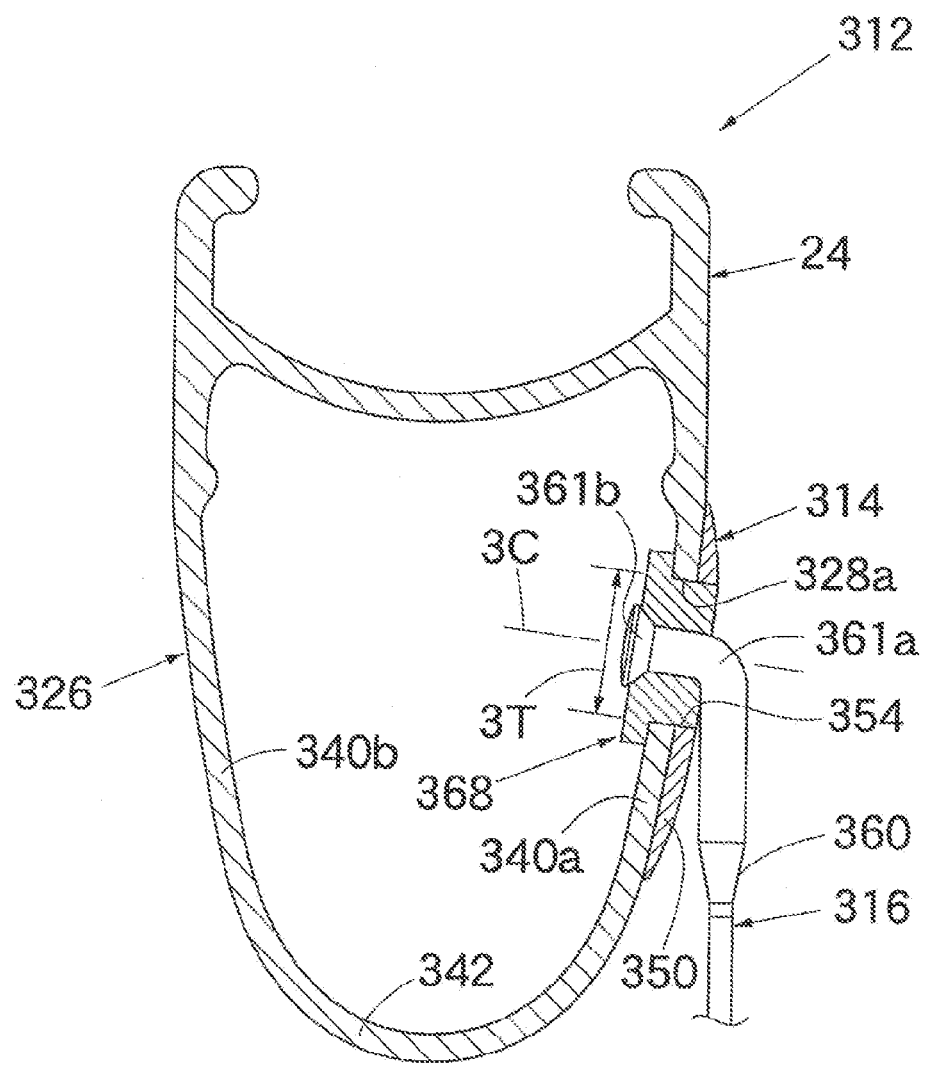
FIG. 29(a) is an enlarged, partial cross-sectional view of the bicycle wheel illustrated in FIG. 28 with the tire removed for the purpose of illustration, as seen along section line 29(a)—29(a) of FIG. 28.
Figure 29B:
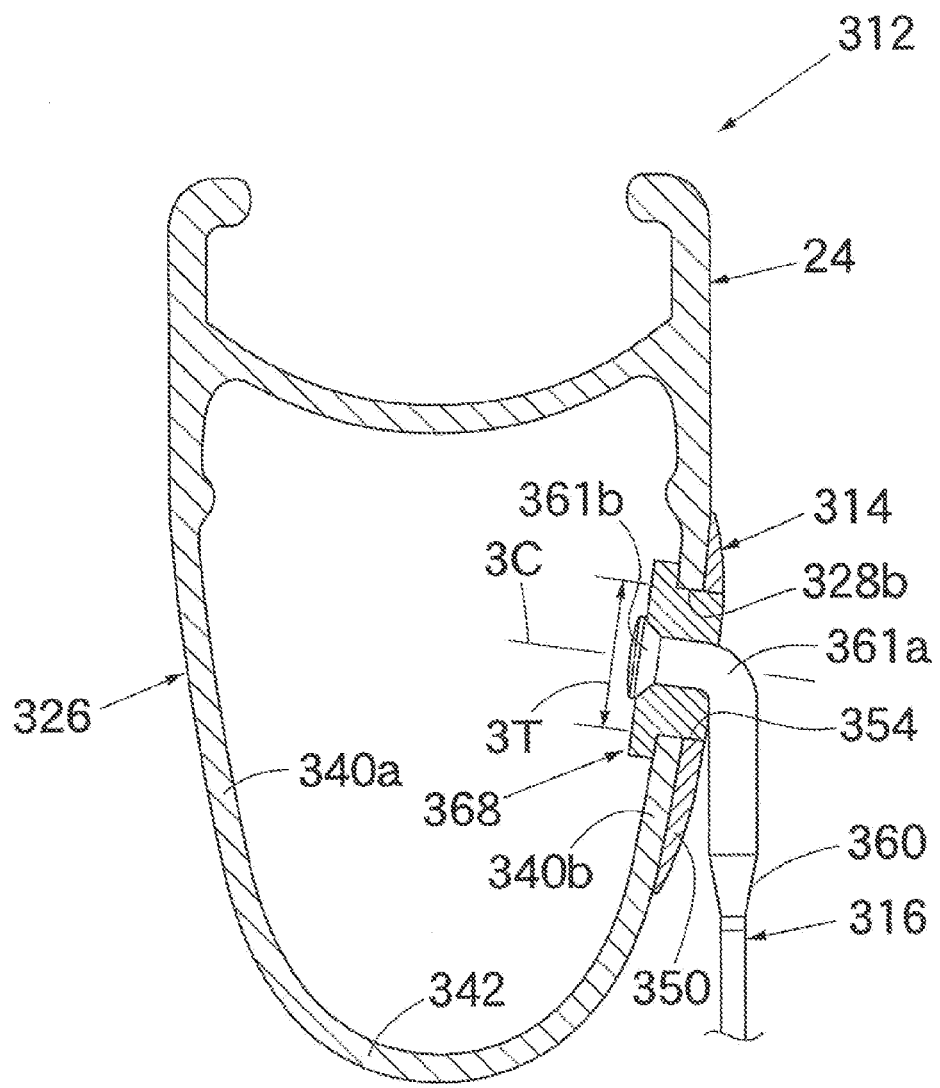
FIG. 29(b) is an enlarged, partial cross-sectional view of the bicycle wheel illustrated in FIG. 28 with the tire removed for the purpose of illustration, as seen along section line 29(b)—29(b) of FIG. 28.
Figure 30:
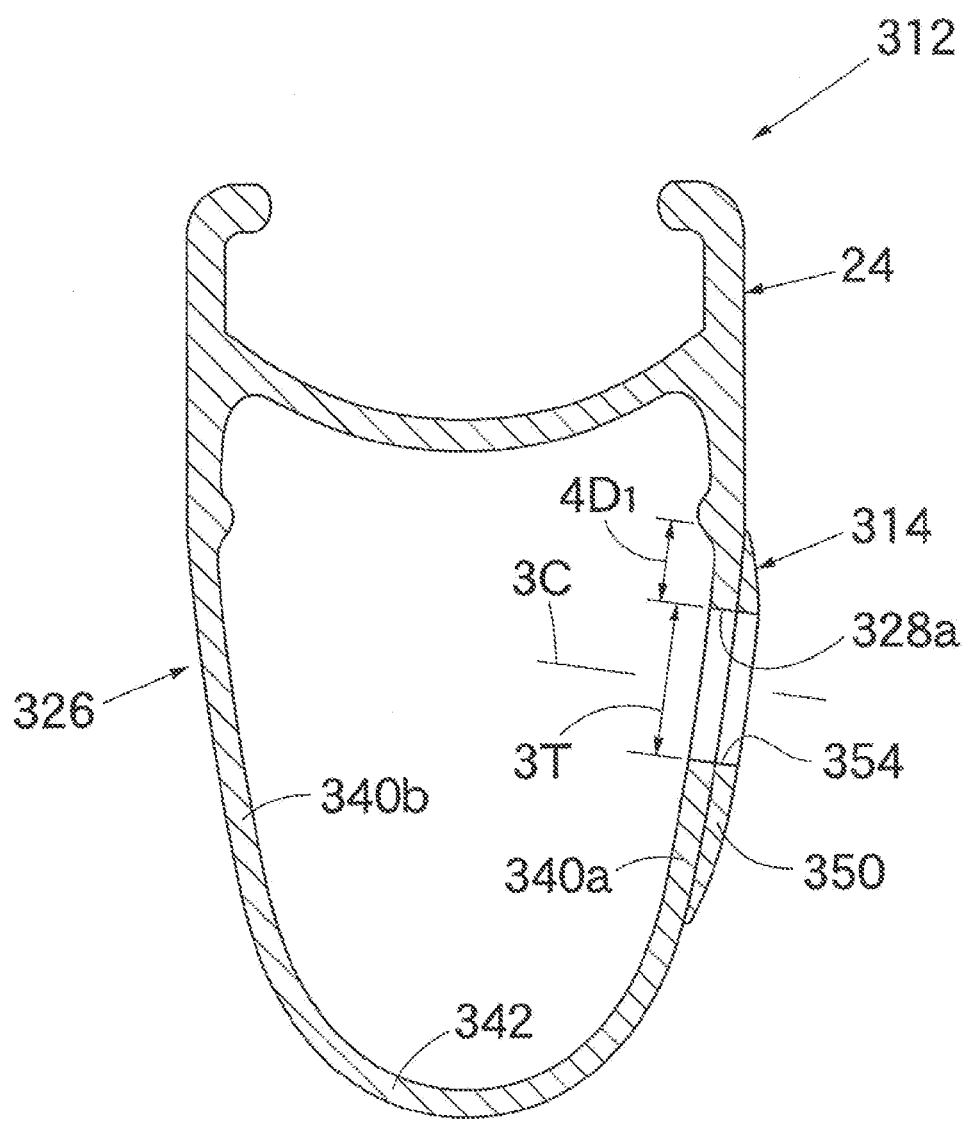
FIG. 30 is an enlarged, partial cross-sectional view of the bicycle wheel illustrated in FIGS. 28, 29(a) and 29(b) with the tire and spoke removed for the purpose of illustration, as seen along section line 29(a)—29(a) of FIG. 28.

The annular connecting section 32 is a curved tubular member that is preferably about 0.9 millimeters thick, and includes a single valve aperture 34 formed therein for coupling a valve 36 therein in a conventional manner, as seen in FIGS. 1 and 4. The annular connecting section 32 is fixedly coupled to the annular side sections 30 at a radial position between the inner and outer ends of the annular side sections 30. Preferably, the connecting section 32 is free of openings, except for the single valve aperture 34 such that the tire 18 can be a tubeless tire. However, it will be apparent to those skilled in the art from this disclosure that the tire 18 could be a tube-type tire, and that the valve aperture 34 could receive the valve of the tube in a conventional manner. Thus, the valve aperture 34 and/or the valve 36 can be designed for a tubeless tire in a conventional manner, and/or for a tube-type tire in a conventional manner. In any case, because the valve 36 is conventional, the valve 36 will not be discussed and/or illustrated in detail herein.

Referring still to FIGS. 1–4, the inner annular portion 26 is a tubular member that has U-shaped cross-sectional shape. The inner annular portion 26 preferably has a constant thickness of about 0.9 millimeters. The inner annular portion 26 basically includes a pair of annular slanted sections 40 and an inner annular section 42 fixedly coupled to the slanted sections 40. The plurality of attachment openings 28a and 28b are formed in the inner annular section 42 and are designed to have the spokes 16 mounted thereto, as discussed below. Thus, the inner annular section 42 is a spoke attachment section of the rim 12. The inner attachment element 42 also preferably includes a single valve aperture 44 formed therein for coupling the valve 36 thereto, as seen in FIGS. 1 and 4. Outer radial ends of the slanted sections 40 are fixedly coupled to inner radial ends of the annular side sections 30 of the outer annular portion 24 at the beads B. Inner radial ends of the slanted sections 40 are fixedly coupled to outer radial ends of the inner annular section 42.

The inner annular section 42 together with the annular slanted sections 40 define interior and exterior surfaces 46 and 48 of the inner annular portion 26. The reinforcement members 14 are preferably fixedly coupled to the exterior surface 48 by welding such that the reinforcement members 14 contact the exterior surface 48 of the inner annular portion 26. The inner annular portion 26 preferably has eight of the attachment openings 28a and eight of the attachment openings 28b arranged in an alternating manner about the entire circumference of the rim 12 for a total of sixteen of the attachment openings 28a and 28b in order to attach a total of sixteen spokes 16. Preferably, the attachment openings 28a and 28b are circumferentially equally spaced apart in the circumferential direction from each other as best understood from FIGS. 1, 2(a) and 2(b).

Figure 2A:
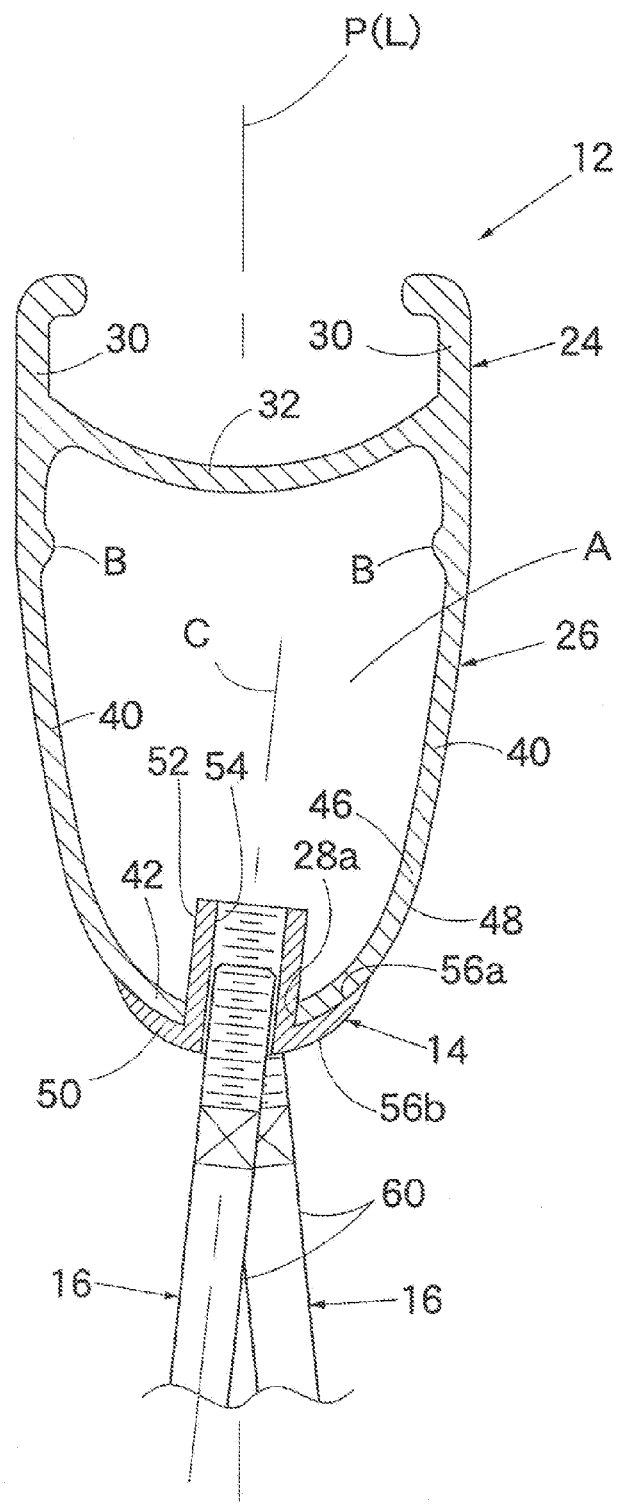
FIG. 2(*a*) is an enlarged, partial cross-sectional view of the bicycle wheel illustrated in FIG. 1 with the tire removed for the purpose of illustration, as seen along section line 2(*a*)—2(*a*) of FIG. 1.
Figure 2B:
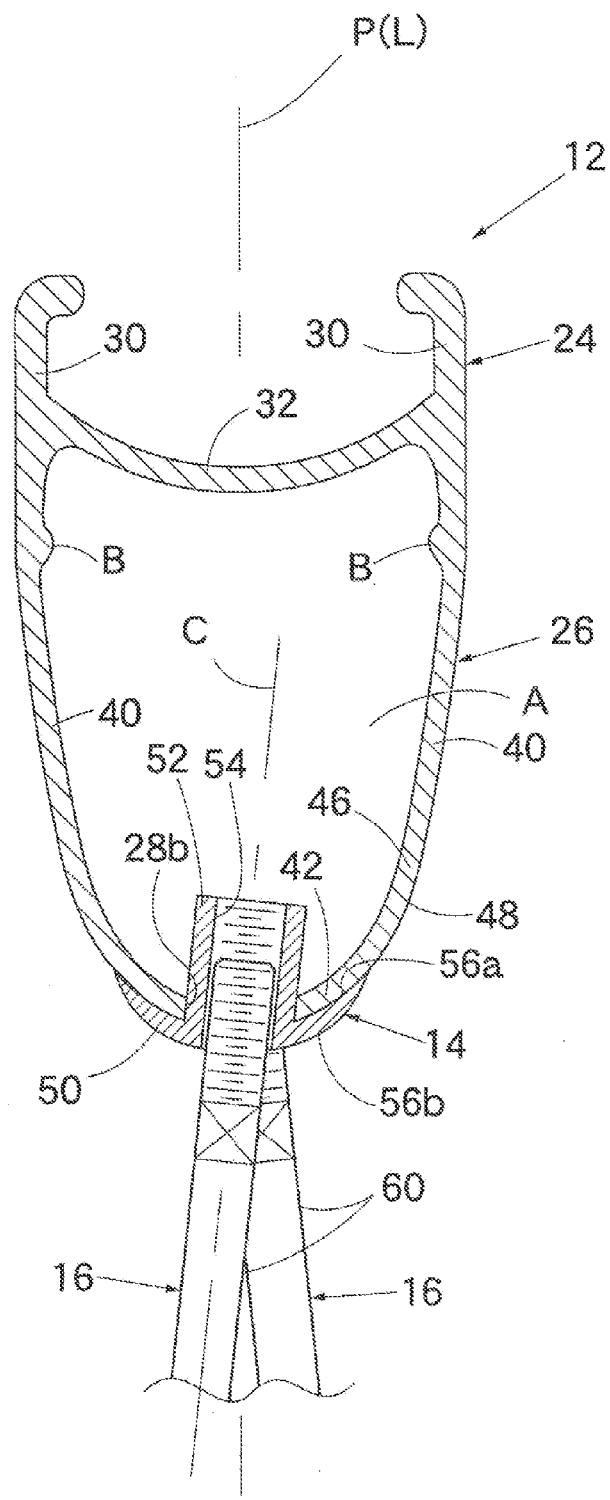

The attachment openings 28a and 28b extend between the interior and exterior surfaces 46 and 48 of the inner annular portion 26. The attachment openings 28a are preferably slightly angled in one direction relative to the center plane P so that the spokes 16 coupled thereto extend to one end of the hub 20, while the attachment openings 28b are preferably slightly angled in an opposite direction relative to the center plane P so that the spokes 16 coupled thereto extend to the opposite end of the hub 20. In other words, the attachment openings 28a are preferably shaped as a mirror image (i.e. inverted image) of the attachment openings 28b relative to the center plane P, as best seen in FIGS. 1, 2(a) and 2(b). Thus, each attachment opening 28a or 28b is configured to receive part of one of the reinforcement members 14 therein.

Of course, it will be apparent to those skilled in the art from this disclosure that the attachment openings 28a and 28b could be identical to each other if needed and/or desired. If the attachment openings 28a and 28b were formed to be identical to each other, the attachment openings should be sufficiently wide so that the reinforcement members 14 can be arranged therein in an alternating angled arrangement such that the spokes 16 extend to opposite ends of the hub 20. Moreover, with such an arrangement, it will be apparent to those skilled in the art from this disclosure that if larger attachment openings are used, then the reinforcement members could be constructed as symmetrical, identical members, as explained below.

Referring now to FIGS. 1–10, the reinforcement members 14 will now be discussed in more detail. As mentioned above, the reinforcement members 14 are preferably identical members that are welded to the exterior surface 48 of the inner annular portion 26 in order to permanently secure the reinforcement members 14 thereto. Each reinforcement member 14 is preferably constructed as a one-piece unitary member from a lightweight, rigid metallic material. Specifically, each reinforcement member 14 is preferably constructed of aluminum, as mentioned above. In any case, the reinforcement members 14 are preferably constructed of the same material as the outer and inner annular portions 24 and 26, and are permanently bonded thereto to reinforce the rim 12. The reinforcement members 14 effectively increase the thickness of the inner annular portion 26 at the attachment openings 28a and 28b to provide rigid reinforcement to the rim 12.

In this embodiment, each of the reinforcement members 14 has a substantially inverted mushroom shape as best shown in FIGS. 5–10. All of the reinforcement members 14 are preferably identical to each other. Thus, only one of the reinforcement members 14 will be discussed and/or illustrated in detail herein. However, the reinforcement members 14 are preferably mounted in an alternating orientation in the respective attachment openings 28a and 28b such that the spokes 16 extend to the appropriate ends of the hub 20, as best seen in FIGS. 1, 2(a) and 2(b).

Each reinforcement member 14 basically includes a base section 50, a tubular section 52 extending from the base section 50 and a through opening 54 extending through both the base section 50 and the tubular section 52. One end of one of the spokes 16 is coupled within the through opening 54 to couple the rim 12 to the hub 20. Specifically, the through opening 54 is preferably a threaded opening in order to threadedly couple one of the spokes 16 thereto. Thus, one of the spokes 16 can be adjustably, releasably and fixedly coupled to the rim 12 via the reinforcement member 14.

The base section 50 is an elongated plate that preferably has a rim facing surface 56a and an exterior facing surface 56b. The base section 50 is curved as viewed in radial cross-section, as best seen in FIG. 9 and 10. The base section 50 preferably has a symmetrical shape as viewed in the radial direction relative to a center longitudinal plane L and a center transverse plane W, as best seen in FIGS. 5 and 6. The base section 50 is substantially oval-shaped. The rim facing surface 56a is a contoured surface that corresponds to the contour of the exterior surface 48 of the inner annular portion 26. The exterior facing surface 56b has a contour substantially the same as the rim facing surface 56a, except that the exterior facing surface 56b tapers toward the rim facing surface 54a at the outer periphery of the base section 50.

The base section 50 preferably has a thickness slightly smaller than the thickness of the inner annular portion 26 of the rim 12. Specifically, the base section 50 preferably has a thickness of about 0.7 millimeters that tapers to a reduced thickness at the outer peripheral edge as best seen in FIGS. 7–10. The thickness of the base section 50 is substantially uniform, except at the outer periphery of the base section 50. While the outer periphery of the base section 50 has a reduced thickness, it also includes a plurality of welding projections 58 extending therefrom that effectively increase the thickness at the outer periphery, prior to welding the reinforcement member 14 to the inner annular portion 26.

During attachment of each reinforcement member 14 to the inner annular portion 26, the welding projections 58 are melted to bond the outer periphery of the reinforcement member 14 to the exterior surface 48 of the inner annular portion 26. Thus, after welding, the welding projections 58 effectively disappear, i.e. melt into a very thin bonding layer fused together with the inner annular portion 26 and the outer periphery of the base section 50. In any case, prior to welding the reinforcement member 14 to the inner annular portion 26, the welding projections 58 extend from the rim facing surface 56a of the base section 50 about 0.2 millimeters. Each of the welding projections 58 is preferably a circular projection with a diameter of about 0.5 millimeters. Preferably, each reinforcement member 14 is welded by flash-butt or laser welding.

The tubular section 52 of each reinforcement member 14 extends from the base section 50 into one of the attachment openings 28a or 28b. The tubular section 52 of each reinforcement member 14 is preferably angled relative to the center plane P when mounted in one of the attachment openings 28a or 28b so that the spokes 16 extend to the appropriate ends of the hub 20. However, opposite axial ends of the base section 50 are preferably arranged at the same radial position when the tubular section 52 is received in one of the attachment openings 28a or 28b. Thus, each reinforcement member 14 is not perfectly or exactly symmetrical relative to the center plane P, which coincides with the center longitudinal plane L of the reinforcement member 14, as best seen in FIGS. 3 and 5–10.

Of course, it will be apparent to those skilled in the art from this disclosure that reinforcement members could be constructed that are completely symmetrical relative to the longitudinal plane L, if the attachment openings 28a and 28b were constructed as identical, slightly larger openings. In such an arrangement, the reinforcement members could be angled slightly relative to the center plane of the rim within the enlarged attachment openings such that the spokes 16 extend to opposite ends of the hub 20. In other words, in such an arrangement, the tubular section of each reinforcement member would be slightly smaller than the attachment openings, in order to accommodate the alternating angled arrangement of the spokes 16, and thus, the tubular sections of the reinforcement members.

Figure 3:
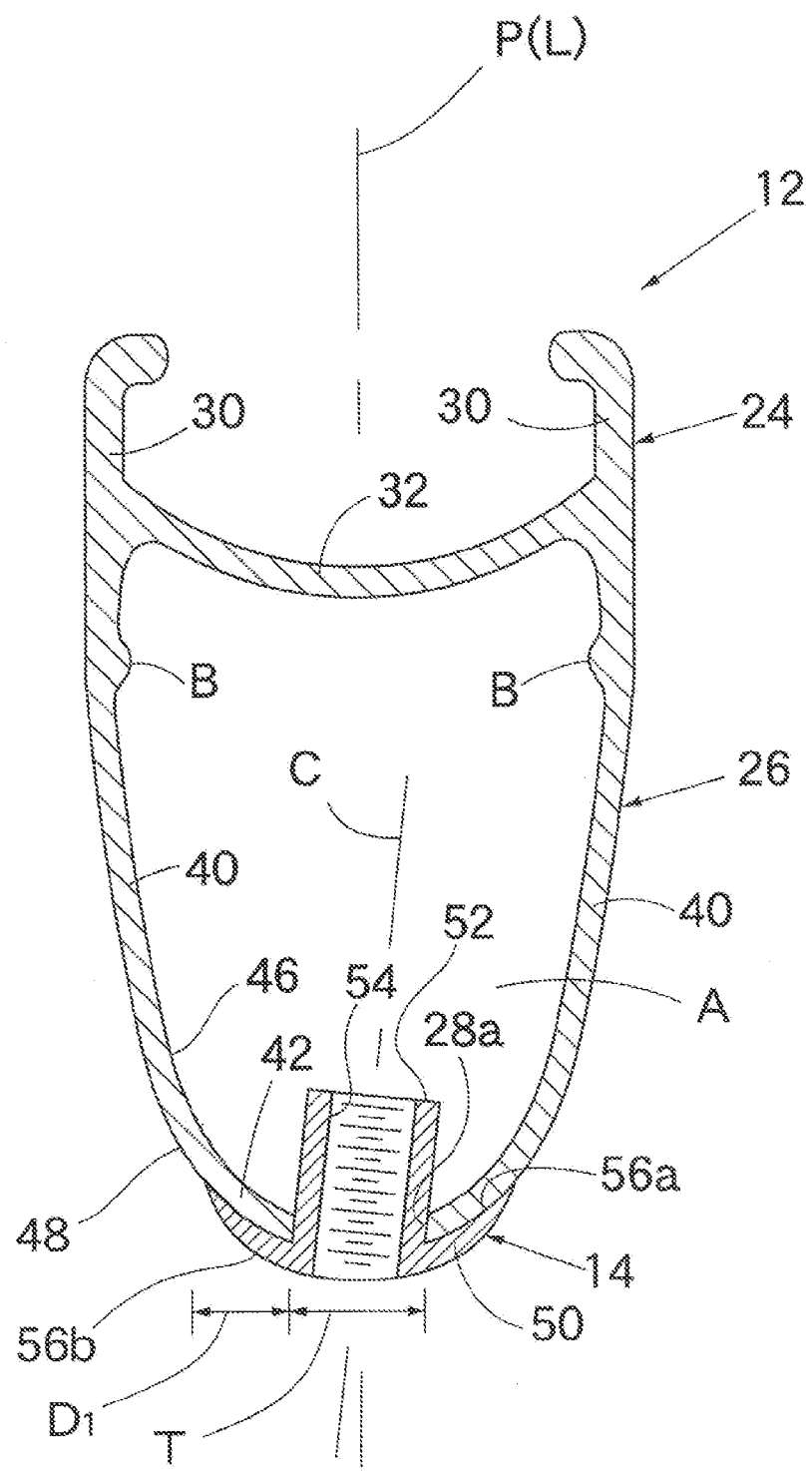
FIG. 3 is an enlarged, partial cross-sectional view of the bicycle wheel illustrated in FIGS. 1, 2(a) and 2(b) with the tire and spokes removed for the purpose of illustration, as seen along section line 2(a)—2(a) of FIG. 1.

As best seen in FIGS. 3, 5 and 6, each of the reinforcement members 14 has a first overlapping dimension $D_1$ and a second overlapping dimension $D_2$ corresponding to the minimum and maximum amounts of overlap of the reinforcement members 14 with the inner annular portion 26. The first and second overlapping dimensions $D_1$ and $D_2$ are measured in a direction transverse to a center axis C of each of the attachment openings 28a and 28b. More specifically, the first and second overlapping dimensions $D_1$ and $D_2$ are preferably measured in the axial and circumferential directions, respectively, relative to the rim 12. Thus, the actual overlapping dimension of the reinforcement member 14 with the inner annular portion 26 varies between the first and second overlapping dimensions $D_1$ and $D_2$. The center axis C corresponds to the center of the tubular section 52, as best seen in FIGS. 5 and 6. This overlapping arrangement of the reinforcement members 14 with the inner annular portion 26 aids in dispersing the stresses on the rim 12 from the spokes 16.

Each of the attachment openings 28a and 28b has maximum transverse dimension T corresponding to the diameter of each attachment opening 28a or 28b. The first overlapping dimension $D_1$ is preferably larger than one-half of the maximum transverse dimension T, while the second overlapping dimension $D_2$ is preferably larger than the maximum transverse dimension T. In any case, the second (maximum) overlapping dimension $D_2$ is larger than one-half of the maximum transverse dimension T.

Referring now to FIGS. 1–4, 13 and 14, the spokes 16 will now be discussed in more detail. The spokes 16 are preferably identical to each other. Each of the spokes 16 basically includes an outer end portion 60, a center or a middle portion 62, an inner end portion 64 and a spoke nipple 66. The outer end portion 60, the center portion 62, and the inner end portion 64 of each spoke 16 are preferably integrally formed together as a one piece, unitary member. The spoke nipples 66 are preferably formed as separate members.

Each of the outer end portions 60 of the spokes 16 has external threads to engage one of the threaded through bores 54 of one of the reinforcement members 14, while each of the inner end portions 64 of the spokes 16 preferably has external threads with one of the spoke nipples 66 threadedly coupled thereto. The outer end of each spoke also has a square section used to rotate the spokes 16. The spokes 16 are placed under tension between the hub 20 and the annular rim 12 by rotating the spoke nipples 66 and/or the spokes 16 in a relatively conventional manner. The spokes 16 are preferably conventional wire-type spokes. Thus, the spokes 16 will not be discussed and/or illustrated in detail herein except as related to the rim 12 of the present invention.

The connections of the spokes 16 to the hub 20 will now be discussed in more detail. The connections of the spokes 16 to the hub 20 are basically identical to the connections disclosed in U.S. Pat. No. 6,431,658, except as explained below. In particular, the hub 20 is a slightly modified version of the front hub disclosed in U.S. Pat. No. 6,431,658, which is designed to be used with the rim 12 having circumferentially equally spaced spoke attachment points. Of course, it will be apparent to those skilled in the art that the rim 12 of the present invention could be coupled to a modified hub that includes rear sprockets, i.e. that is similar to the rear hub disclosed in U.S. Pat. No. 6,431,658, but modified to accommodate the circumferentially equally spaced spoking arrangement disclosed herein. Moreover, it will be apparent to those skilled in the art from this disclosure that the rim 12 with reinforcement members 14 could be modified in order to accommodate such a spoking arrangement or other spoking arrangements as needed and/or desired.

Referring to FIGS. 1 and 11–14, the connections of the spokes 16 and the rim 12 to the hub 20 will now be discussed in more detail. The hub 20 basically includes a tubular hub body portion 84, first and second bearing assemblies 85a and 85b, and a hub axle 86 rotatably supported in the tubular body portion 84 by the bearing assemblies 85a and 85b. The parts of the hub 20 are relatively conventional. Thus, the parts of the hub 20 will not be discussed or illustrated in detail herein.

The tubular body portion 84 has a tubular center portion 87 and a pair of tubular mounting portions 88a and 88b at opposite ends of the center portion 87 for mounting the spokes 16 thereto. Each tubular mounting portion 88a and 88b has a plurality of spoke openings 89a and 89b for coupling the spokes 16 therein, respectively. Preferably, each mounting portion 88a and 88b has eight spoke openings 89a and 89b formed therein, respectively.

Preferably, the second mounting portion 88b is an offset mirror image of first mounting portion 88a. Thus, the spoke openings 89b are preferably circumferentially offset from the spoke openings 89a so that the outer end portions 64 of the spokes 16 are circumferentially equally spaced from each other at the rim 12. The tubular mounting portions 88a and 88b support the spokes 16 in the spoke openings 89a and 89b with the spoke nipples 66.

Second Embodiment

Referring now to FIGS. 15–27, a bicycle wheel 210 in accordance with a second preferred embodiment will now be explained. The bicycle wheel 210 is identical to the bicycle wheel 10 of the first embodiment, except that the bicycle wheel 210 uses a modified rim 212 having modified reinforcement members 214 with modified spokes 216 coupled thereto. In view of the similarities between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Additionally, in view of the similarities between this second embodiment and the first embodiment, the descriptions and illustrations of this second embodiment will focus mainly on the differences between this second embodiment and the first embodiment. However, it will be apparent to those skilled in the art from this disclosure that the descriptions and illustrations of the first embodiment also apply to this second embodiment, except as explained and illustrated herein.

The bicycle wheel 210 of this second embodiment basically includes the rim 212 having the reinforcement members 214, the spokes 216, a tire 18 and a hub 20. In other words, the modified rim 212 and spokes 216 of this second embodiment are designed to be used with the tire 18 and the hub 20 of the first embodiment. The rim 212 basically includes a modified inner annular portion 226 (i.e. spoke attachment portion) having a plurality of modified attachment openings 228a and 228b with the modified reinforcement members 214 fixedly coupled to the inner annular portion 226 at the attachment openings 228a and 228b, preferably by welding in a manner identical to the first embodiment. The attachment openings 228a and 228b are identical to the attachment openings 28a and 28b of the first embodiment, respectively, except that the attachment openings 228a and 228b are larger.

The reinforcement members 214 are also identical to the reinforcement members 14 of the first embodiment, except that each of the reinforcement members 214 includes a larger tubular section 252 and a larger internally threaded through bore 254 configured to attach one of the modified spokes 216 thereto. Due to this enlargement of parts of the reinforcement members 214, smaller overlapping dimensions between the reinforcement members 214 and the inner annular portion 226 are provided. Specifically, in this embodiment, each of the reinforcement members 214 has a first overlapping dimension $2D_1$, and a second overlapping dimension $2D_2$ corresponding to the minimum and maximum amounts of overlap of the reinforcement members 214 with the inner annular portion 226. The first and second overlapping dimensions $2D_1$, and $2D_2$ are measured in a direction transverse to a center axis 2C of each of the attachment openings 228a and 228b. More specifically, the first and second overlapping dimensions $2D_1$, and $2D_2$ are measured in the axial and circumferential directions, respectively, relative to the rim 212. Thus, the actual overlapping dimension of the reinforcement member 214 with the inner annular portion 226 varies between the first and second overlapping dimensions $2D_1$, and $2D_2$. The center axis 2C corresponds to the center of the tubular section 252, as best seen in FIGS. 18 and 19. This overlapping arrangement of the reinforcement members 214 with the inner annular portion 226 aids in dispersing the stresses on the rim 212 from the spokes 216.

Each of the attachment openings 228a and 228b has a maximum transverse dimension 2T corresponding to the diameter of each attachment opening 228a or 228b. The first overlapping dimension $2D_1$, is preferably equal to about one-half of the maximum transverse dimension 2T, while the second overlapping dimension $2D_2$ is preferably about equal to the maximum transverse dimension 2T. In any case, the second (maximum) overlapping dimension $2D_2$ is larger than one-half of the maximum transverse dimension 2T.

The spokes 216 will now be discussed in more detail. The spokes 216 are identical to the spokes 16 of the first embodiment, except that each of the spokes 216 includes a modified outer end portion 260. The outer end portion 260 of each spoke 216 includes a shaft 261a, an enlarged head 261b arranged at the free end of the shaft 261a and an adapter 268 mounted on the shaft 261a. The adapter 268 has a through bore with a seat designed to engage the head 261b and external threads configured to mate with the threaded through bore 254 of one of the reinforcement members 214. Each adapter further includes a hexagonal portion 269 utilized to rotate the adapter 268.

Third Embodiment

Referring now to FIGS. 28–36, a bicycle wheel 310 in accordance with a third preferred embodiment will now be explained. The bicycle wheel 310 is identical to the bicycle wheel 10 of the first embodiment, except that the bicycle wheel 310 uses a modified rim 312 having modified reinforcement members 314 with modified spokes 316 coupled thereto. In view of the similarities between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. Additionally, in view of the similarities between this third embodiment and the first embodiment, the descriptions and illustrations of this third embodiment will focus mainly on the differences between this third embodiment and the first embodiment. However, it will be apparent to those skilled in the art from this disclosure that the descriptions and illustrations of the first embodiment also apply to this third embodiment, except as explained and illustrated herein.

The bicycle wheel 310 of this third embodiment basically includes the rim 312 having the reinforcement members 314, the spokes 316, a tire 18 and a hub 20. In other words, the modified rim 312 and the spokes 316 of this third embodiment are designed to be used with the tire 18 and the hub 20 of the first embodiment. The rim 312 basically includes a modified inner annular portion 326 (i.e. spoke attachment portion) having a plurality of modified attachment openings 328a and 328b with the modified reinforcement members 314 fixedly coupled to the inner annular portion 326 at the attachment openings 328a and 328b, preferably by welding in a manner identical to the first embodiment.

In this third embodiment, the inner annular portion 326 includes a pair of annular slanted sections 340a and 340b and an inner annular section 342 fixedly coupled to the slanted sections 340a and 340b. The slanted sections 340a and 340b and the inner section 342 are identical to the slanted sections 40 and inner section 42 of the first embodiment, except for the locations of the attachment openings 328a and 328b. Specifically, the plurality of attachment openings 328a and 328b are formed in the slanted sections 340a and 340b, respectively, in this third embodiment rather than in the inner annular section 342. The inner annular section 342 is free of attachment openings. The attachment openings 328a and 328b are circular shaped openings that are arranged in an alternating, circumferentially equally spaced arrangement.

The reinforcement members 314 are similar to the reinforcement members 14 of the first embodiment, except that each of the reinforcement members 314 includes a modified base section 350 and a modified through bore 354. The tubular section 52 of the first embodiment is eliminated in this third embodiment. The base section 350 has a modified shape, size and contour from the base section 50 of the first embodiment in order to contact the slanted sections 340a and 340b of the inner annular portion 326. The through bore 354 has a size and shape that corresponds to the attachment openings 328a and 328b. The through bore 354 is unthreaded. Due to the modified size/shape of the reinforcement members 314, modified overlapping dimensions between the reinforcement members 314 and the inner annular portion 326 are provided.

Figure 31:
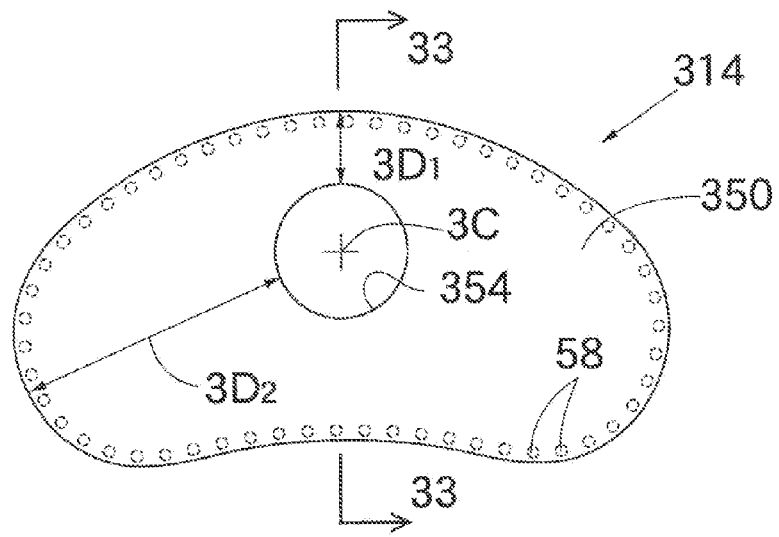
FIG. 31 is an enlarged, outside (axial) elevational view of one of the reinforcement members illustrated in FIGS. 28–30.
Figure 32:
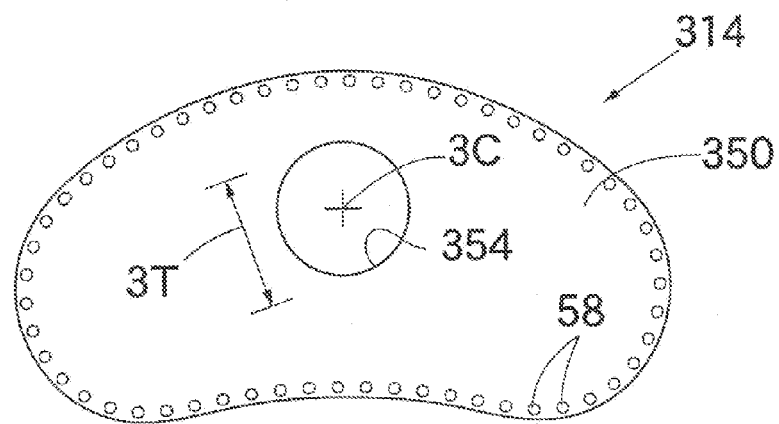
FIG. 32 is an inside (axial) elevational view of the reinforcement member illustrated in FIG. 31.
Figure 33:
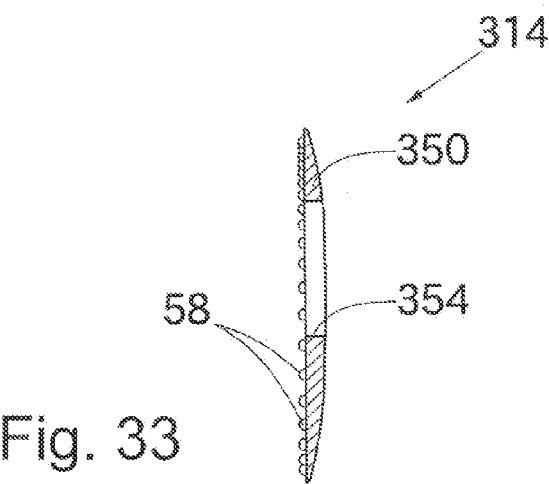
FIG. 33 is a cross-sectional view of the reinforcement member illustrated in FIGS. 31 and 32 as seen along section line 33—33 of FIG. 31.

Specifically, in this embodiment, each of the reinforcement members 314 has a first overlapping dimension $3D_1$, and a second overlapping dimension $3D_2$ corresponding to the minimum and maximum amounts of overlap of the reinforcement members 314 with the inner annular portion 326. The first and second overlapping dimensions $3D_1$ and $3D_2$ are measured in a direction transverse to a center axis 3C of each of the attachment openings 328a and 328b. More specifically, the first and second overlapping dimensions $3D_1$, and $3D_2$ are measured in the substantially radial direction and substantially in the circumferential direction relative to the rim 312, respectively. Thus, the actual overlapping dimension of each reinforcement member 314 with the inner annular portion 326 varies between the first and second overlapping dimensions $3D_1$, and $3D_2$. The center axis 3C corresponds to the center of the through bore 354, as best seen in FIGS. 31–33. This overlapping arrangement of the reinforcement members 314 with the inner annular portion 326 aids in dispersing the stresses on the rim 312 from the spokes 316.

Each of the attachment openings 328a and 328b has a maximum transverse dimension 3T corresponding to the diameter of each attachment opening 328a or 328b. The first overlapping dimension $3D_1$, is preferably equal to about one-half of the maximum transverse dimension 3T, while the second overlapping dimension $3D_2$ is preferably about equal to twice the maximum transverse dimension 3T. In any case, the second (maximum) overlapping dimension $3D_2$ is larger than one-half of the maximum transverse dimension 3T.

Figure 34:
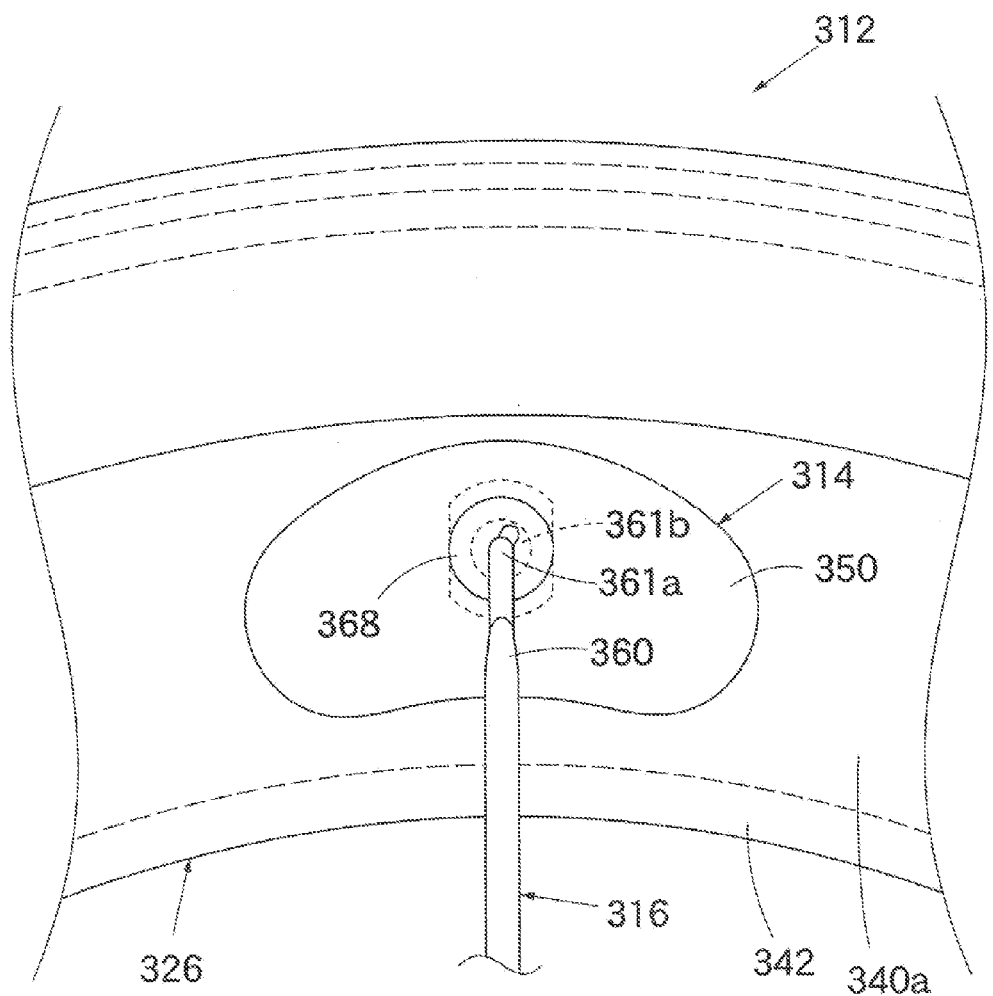
FIG. 34 is an enlarged, partial side elevational (axial) view of the rim of the bicycle wheel illustrated in FIGS. 28–30, with one of the spokes securely coupled thereto.
Figure 35:
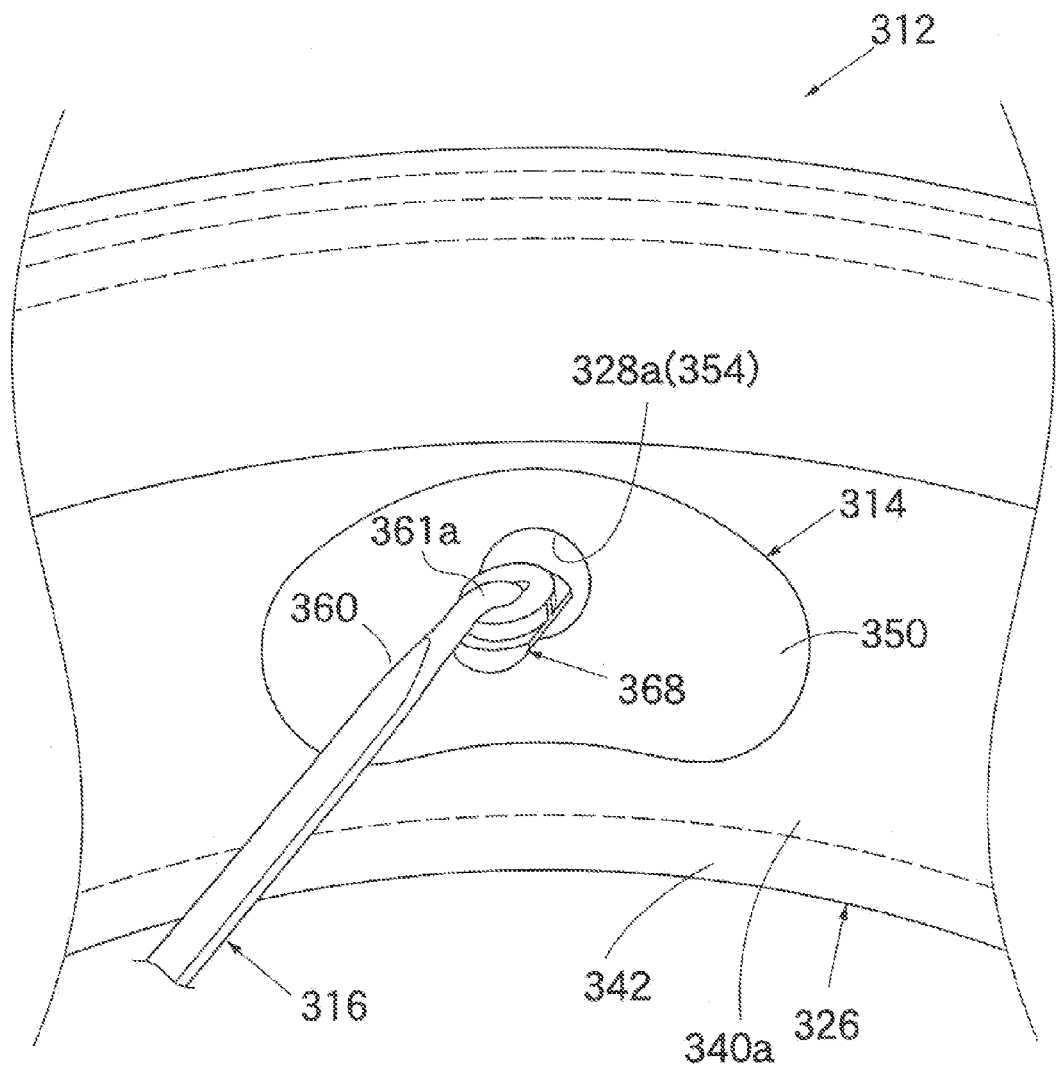
FIG. 35 is partial side elevational (axial) view of the rim of the bicycle wheel illustrated in FIGS. 28–30 and 34, prior to inserting the outer end of one of the spokes into one of the spoke attachment openings of the rim.
Figure 36:
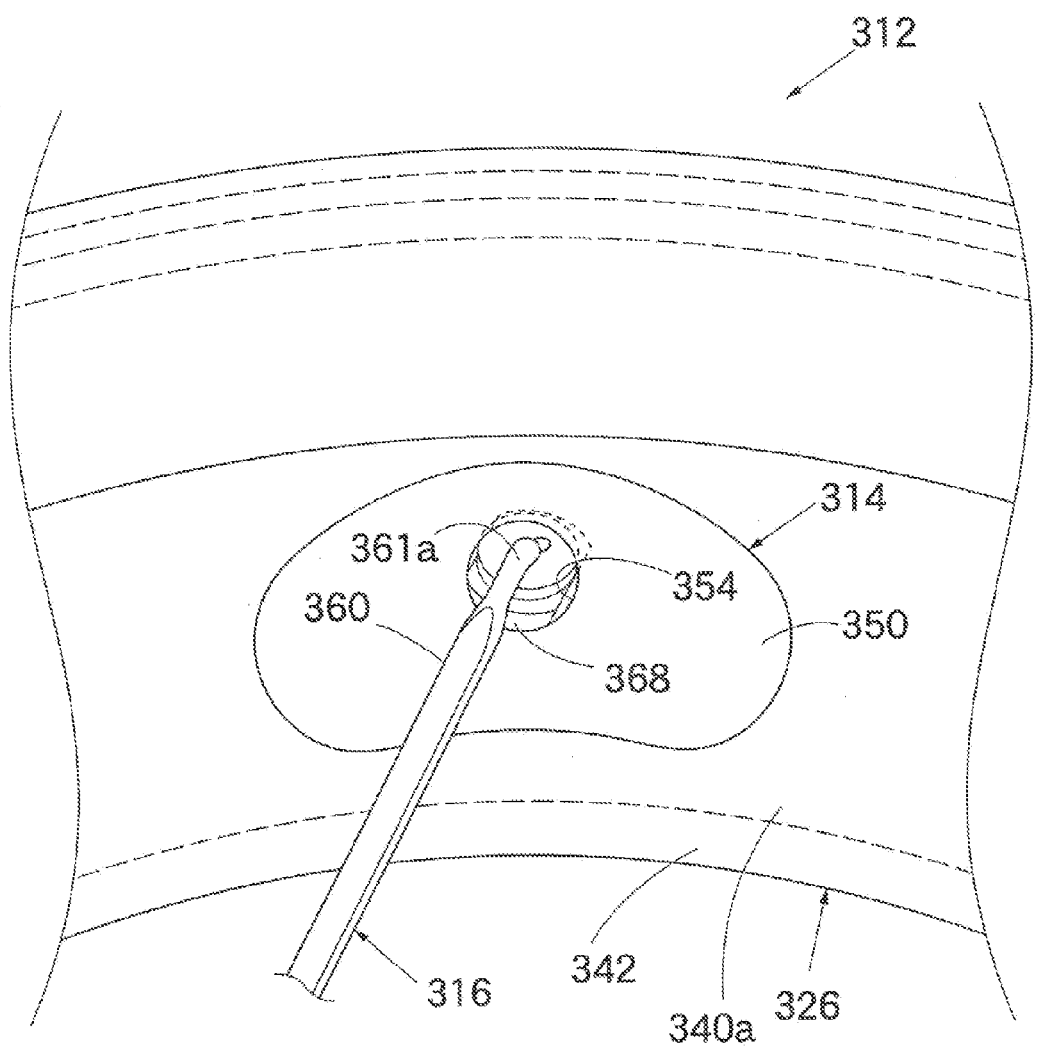
FIG. 36 is partial side elevational (axial) view of the rim of the bicycle wheel illustrated in FIGS. 28–30 and 34, with the outer end of one of the spokes partially inserted into one of the spoke attachment openings of the rim.
Figure 37:
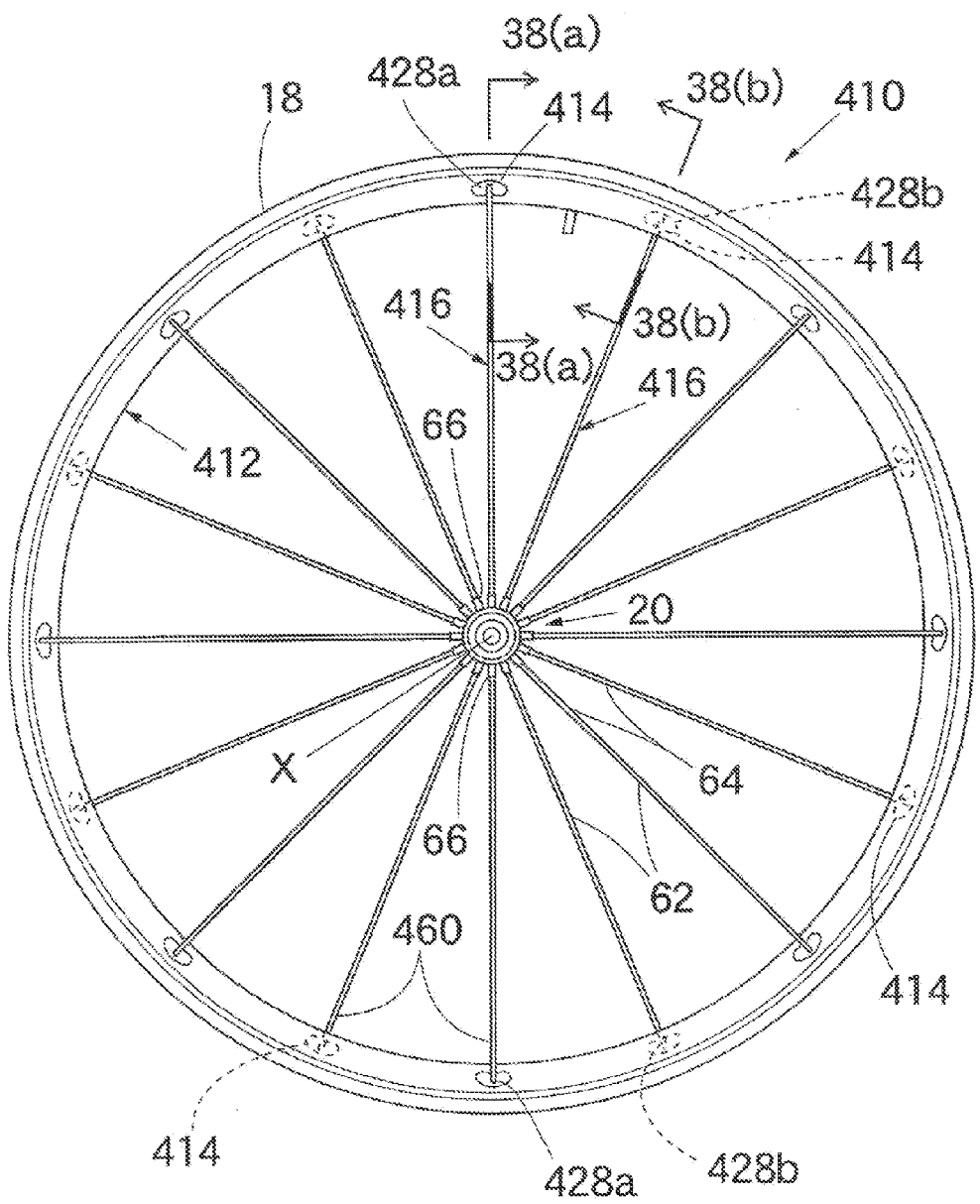
FIG. 37 is a side elevational view of a bicycle wheel with a reinforced rim in accordance with a fourth preferred embodiment of the present invention.
Figure 38A:
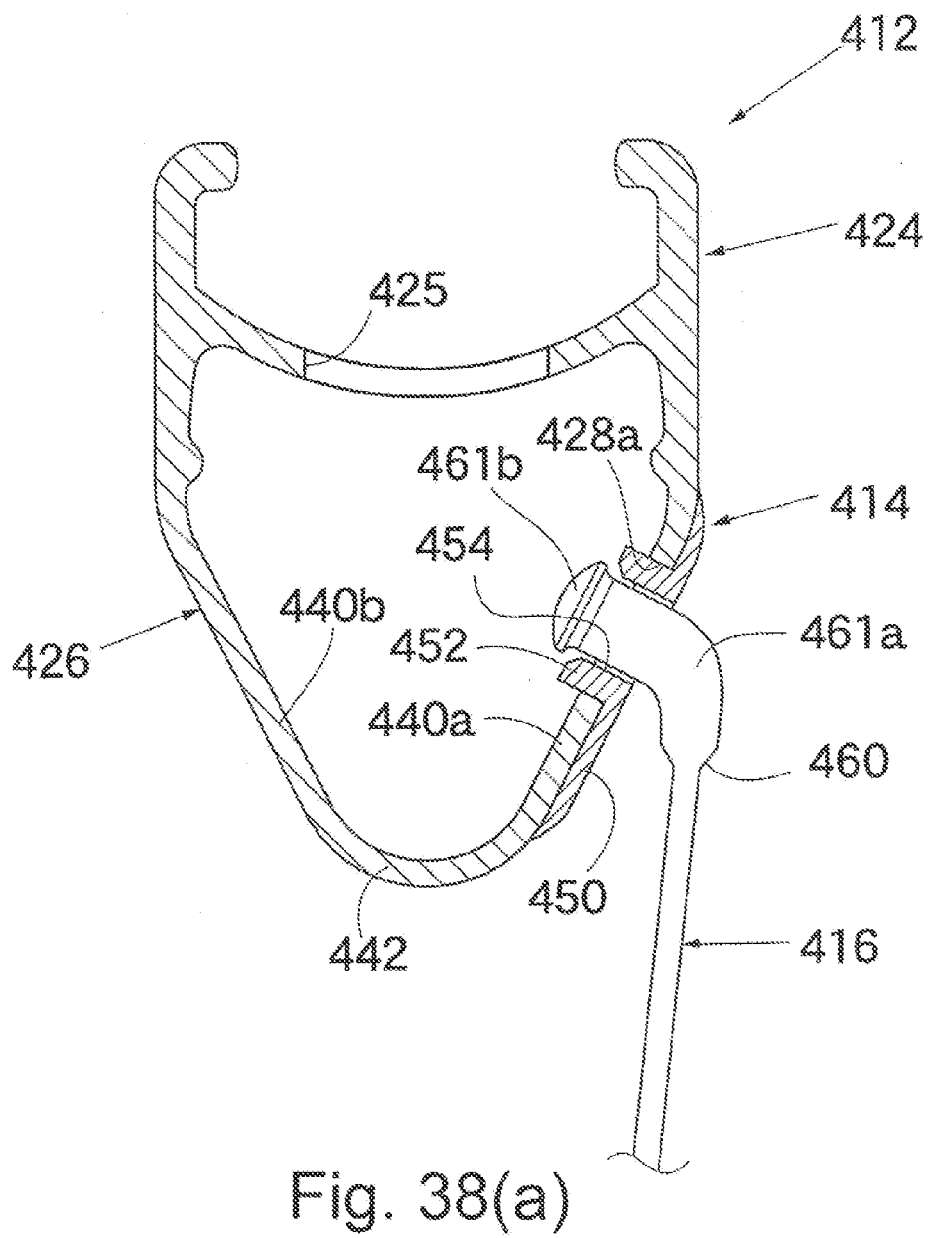
FIG. 38(a) is an enlarged, partial cross-sectional view of the bicycle wheel illustrated in FIG. 37 with the tire removed for the purpose of illustration, as seen along section line 38(a)—38(a) of FIG. 37.
Figure 38B:
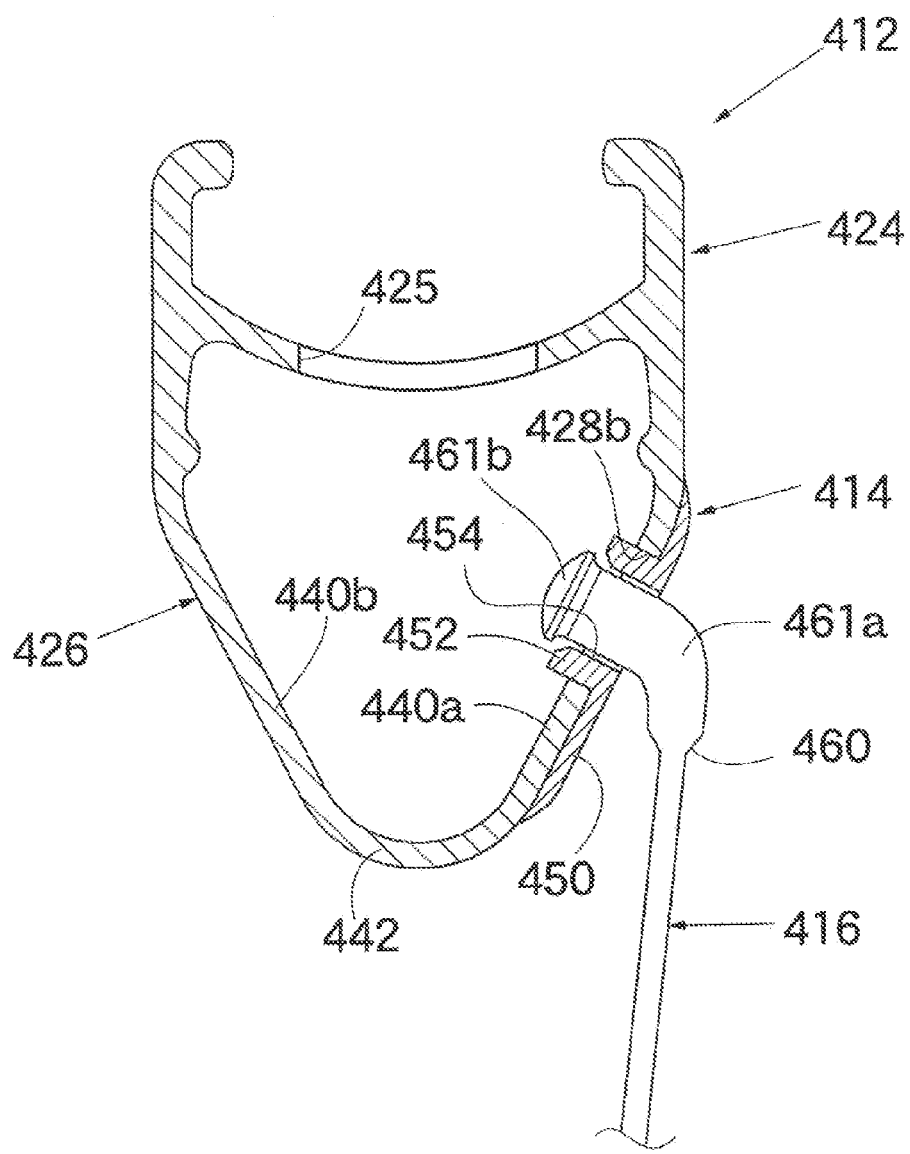
FIG. 38(b) is an enlarged, partial cross-sectional view of the bicycle wheel illustrated in FIG. 37 with the tire removed for the purpose of illustration, as seen along section line 38(b)—38(b) of FIG. 37.
Figure 39:
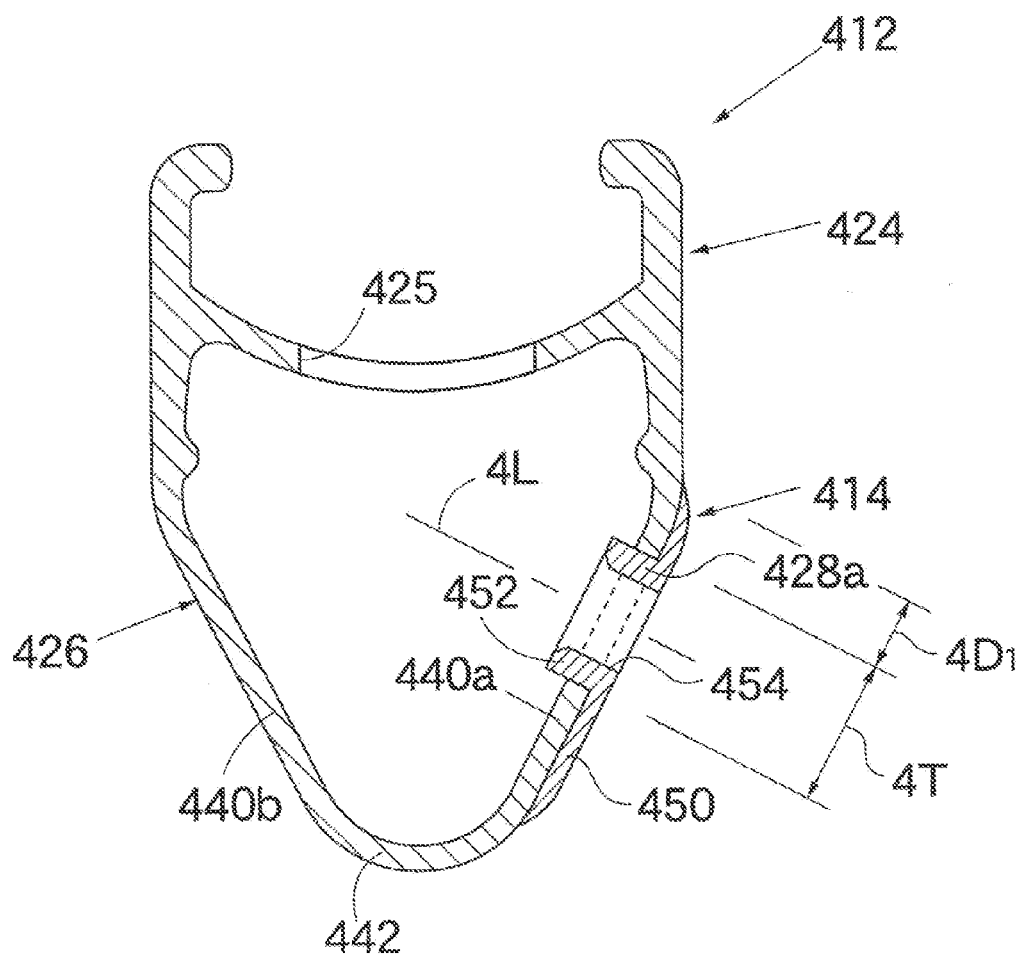
FIG. 39 is an enlarged, partial cross-sectional view of the bicycle wheel illustrated in FIGS. 37, 38(a) and 38(b) with the tire and spoke removed for the purpose of illustration, as seen along section line 38(a)—38(a) of FIG. 37.

The spokes 316 will now be discussed in more detail. The spokes 316 are identical to the spokes 16 of the first embodiment, except each of the spokes 316 includes a modified outer end portion 360 with a separate reinforcing washer 368 mounted thereon. The outer end portion 360 of each spoke 316 includes a bent shaft 361a, an enlarged head 361b arranged at the free end of the shaft 361a and the reinforcing washer 368 mounted on the shaft 361a. The reinforcing washer 368 has a through bore with a seat designed to engage the head 361b. The outer ends 360 are constructed in accordance with U.S. Pat. No. 6,536,849 such that the outer end portions 360 of the spokes 316 can be inserted through the openings 328a, 328b and 354 in a first orientation, but retained in the openings 328a, 328b and 354 in a second orientation, as best seen in FIGS. 34–36. Accordingly, the spokes 316 will not be discussed in further detail herein.

Fourth Embodiment

Referring now to FIGS. 37–42, a bicycle wheel 410 in accordance with a fourth preferred embodiment will now be explained. The bicycle wheel 410 is identical to the bicycle wheel 10 of the first embodiment, except that the bicycle wheel 410 uses a modified rim 412 having modified reinforcement members 414 with modified spokes 416 coupled thereto. In view of the similarities between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. Additionally, in view of the similarities between this fourth embodiment and the first embodiment, the descriptions and illustrations of this fourth embodiment will focus mainly on the differences between this fourth embodiment and the first embodiment. However, it will be apparent to those skilled in the art from this disclosure that the descriptions and illustrations of the first embodiment also apply to this fourth embodiment, except as explained and illustrated herein.

The bicycle wheel 410 of this fourth embodiment basically includes the rim 412 having the reinforcement members 414, the spokes 416, a tire 18 and a hub 20. In other words, the modified rim 412 and the spokes 416 of this third embodiment are designed to be used with the tire 18 and the hub 20 of the first embodiment. The rim 412 basically includes a modified outer annular portion 424 (i.e. tire attachment portion) and a modified inner annular portion 426 (i.e. spoke attachment portion) having a plurality of modified attachment openings 428a and 428b with the modified reinforcement members 414 fixedly coupled to the inner annular portion 426 at the attachment openings 428a and 428b, preferably by welding in a manner identical to the first embodiment.

In this fourth embodiment, the outer annular portion 424 is identical to the outer annular portion 24 of the first embodiment, except that the outer annular portion 424 includes a plurality of circumferentially equally spaced access openings 425 arranged adjacent the attachment openings 428a and 428b such that the spokes 416 can be inserted through one of the access openings 425 into one of the attachment openings 428a or 428b.

The inner annular portion 426 has a different cross-sectional shape than the inner annular portions 26, 226 and 326 of the first, second and third embodiments, respectively. Specifically, the inner annular portion 326 has a modified shape so that the spokes 416 can be inserted through the access openings 425 into the attachment openings 428a and 428b with the reinforcement members 414. Otherwise, the inner annular portion 426 is identical to the inner annular portion 326 of the third embodiment. Thus, the inner annular portion 426 includes a pair of annular slanted sections 440a and 440b and an inner annular section 442 fixedly coupled to the slanted sections 440a and 440b.

The slanted sections 440a and 440b and the inner section 442 are functionally identical to the slanted sections 340a and 340b and the inner section 342 of the third embodiment. Specifically, the plurality of attachment openings 428a and 428b are formed in the slanted sections 440a and 440b, respectively, in this fourth embodiment. The inner annular section 442 is free of attachment openings. The attachment openings 428a and 428b are circular shaped openings that are arranged in an alternating, circumferentially equally spaced arrangement. The attachment openings 428a and 428b are preferably circular openings with a size and shape identical to the attachment openings 328a and 328b.

The reinforcement members 414 are similar to the reinforcement members 14 of the first embodiment, except that each of the reinforcement members 414 includes a modified base section 450, a modified tubular section 452 and a modified through bore 454 extending through the base section 450 and the tubular section 452. Specifically, the reinforcement members 414 are identical to the reinforcement members 314 of the third embodiment, except that the reinforcement members 414 include the tubular section 452 and the through bore 454 that has a smaller diameter than the through bores 354 of the third embodiment. The base section 450 has a modified shape, size and contour from the base section 50 of the first embodiment in order to contact the slanted sections 440a and 440b of the inner annular portion 426. The tubular section 452 is sized to be received in the through openings 428a and 428b, while the through bore 454 has a size and shape that corresponds to a portion of the spokes 416, discussed below. The through bore 454 is unthreaded.

Figure 40:
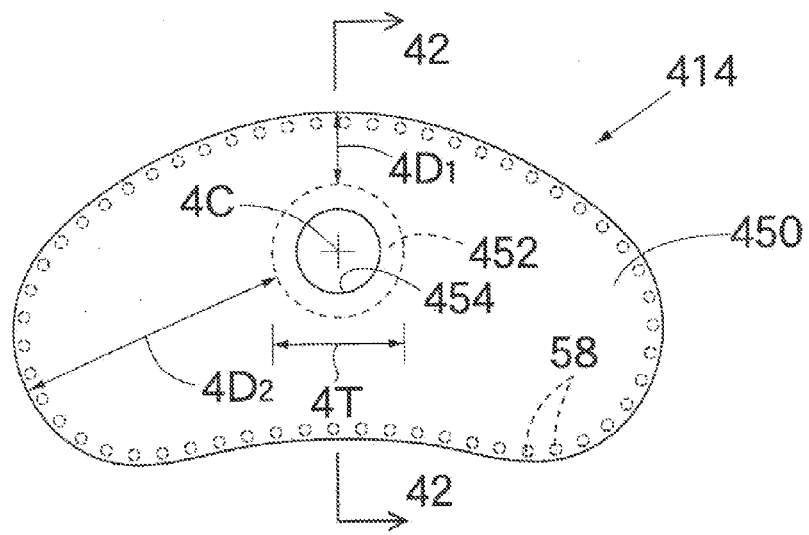
FIG. 40 is an enlarged, outside elevational view of one of the reinforcement members illustrated in FIGS. 37–39.
Figure 41:
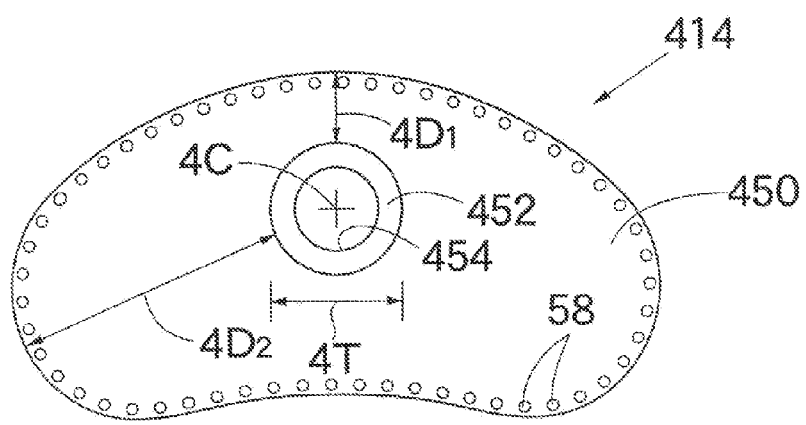
FIG. 41 is an inside elevational view of the reinforcement member illustrated in FIG. 40.
Figure 42:
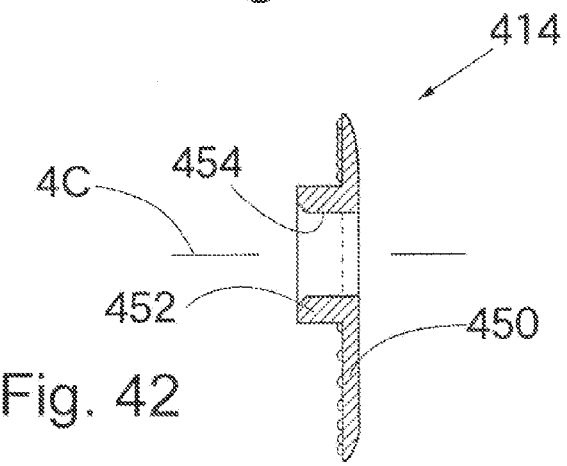
FIG. 42 is a cross-sectional view of the reinforcement member illustrated in FIGS. 40 and 42 as seen along section line 42—42 of FIG. 40.

In this embodiment, each of the reinforcement members 414 has a first overlapping dimension $4D_1$, and a second overlapping dimension $4D_2$ corresponding to the minimum and maximum amounts of overlap of the reinforcement members 414 with the inner annular portion 426. The first and second overlapping dimensions $4D_1$, and $4D_2$ are measured in a direction transverse to a center axis 4C of each of the attachment openings 428a and 428b. More specifically, the first and second overlapping dimensions $4D_1$, and $4D_2$ are measured in the substantially radial direction and substantially in the circumferential direction relative to the rim 412, respectively. Thus, the actual overlapping dimension of each reinforcement member 414 with the inner annular portion 426 varies between the first and second overlapping dimensions $4D_1$, and $4D_2$. The center axis 4C corresponds to the center of the through bore 454, as best seen in FIGS. 40–42. This overlapping arrangement of the reinforcement members 414 with the inner annular portion 426 aids in dispersing the stresses on the rim 412 from the spokes 416.

Each of the attachment openings 428a and 428b has a maximum transverse dimension 4T corresponding to the diameter of each attachment opening 428a or 428b. The first overlapping dimension $4D_1$, is preferably equal to about one-half of the maximum transverse dimension 4T, while the second overlapping dimension $4D_2$ is preferably about equal to twice the maximum transverse dimension 4T. In any case, the second (maximum) overlapping dimension $4D_2$ is larger than one-half of the maximum transverse dimension 4T.

The spokes 416 will now be discussed in more detail. The spokes 416 are identical to the spokes 16 of the first embodiment, except that each of the spokes 416 includes a modified outer end portion 460. The outer end portion 460 of each spoke 416 includes a bent shaft 461a, an enlarged head 461b arranged at the free end of the shaft 461a. Thus, the spokes 416 are insertable through the access openings 425 into the through bore 454 until the bent shaft 461a and the enlarged head 461b of each spoke 416 is properly seated within the through bore 454 of one of the reinforcement members 414. The spokes 416 are relatively conventional. Accordingly, the spokes 416 will not be discussed in further detail herein.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rim comprising:
    an annular tire attachment portion adapted to have a tire mounted thereon;
    an annular spoke attachment portion fixedly coupled with the tire attachment portion, the spoke attachment portion including an interior surface, a pair of annular side sections and an inner annular section to form a substantially U-shaped cross-sectional shape with an annular hollow area, the spoke attachment portion further including a plurality of circumferentially spaced attachment openings with each opening having a central axis extending therethrough;
    a plurality of reinforcement members fixedly coupled to the spoke attachment portion at the attachment openings to effectively increase the thickness of the spoke attachment portion of the rim at the attachment openings, each of the reinforcement members being welded to the spoke attachment portion, each reinforcement member including:
        a rim facing surface contacting an outer surface of the spoke attachment portion of the rim,
        an exterior facing surface that faces in an opposite direction from the rim facing surface,
        a through opening extending between the rim facing surface and the exterior facing surface that is aligned with one of the attachment openings, and
        a tubular section extending through a respective one of the attachment openings of the spoke attachment portion and having internal threads; and
    a plurality of adapters having external threads that each mate with the internal threads of the tubular sections of the reinforcement members,
    the interior surface being free from contact with the reinforcement member.

2. The bicycle rim according to claim 1, wherein each of the reinforcement members is elongated in the circumferential direction of the rim.

3. The bicycle rim according to claim 1, wherein the rim facing surface of each of the reinforcement members has a contour that corresponds to a contour of the outer surface of the spoke attachment portion.

4. The bicycle rim according to claim 1, wherein
each of the reinforcement members is welded around an outer periphery thereof that is spaced from the through opening.

5. The bicycle rim according to claim 1, wherein
each of the reinforcement members is integrally formed as a one-piece, unitary member.

6. The bicycle rim according to claim 1, wherein
the attachment openings are formed in the inner annular section such that the central axes of the attachment openings extend in a substantially radial direction of the rim.

7. A bicycle rim comprising:
an annular tire attachment portion adapted to have a tire mounted thereon, the tire attachment portion including an annular bridge section extending between a pair of annular tire support sections to form a substantially U-shaped cross-sectional shape;
an annular spoke attachment portion fixedly coupled to the tire attachment portion to form an annular hollow area therebetween, the spoke attachment portion including an interior surface and a plurality of circumferentially spaced attachment openings with each opening having a central axis extending therethrough;
a plurality of reinforcement members fixedly coupled to the spoke attachment portion at the attachment openings to effectively increase the thickness of the spoke attachment portion of the rim at the attachment openings, each of the reinforcement members being welded to the spoke attachment portion, each reinforcement member including:
  a rim facing surface contacting an outer surface of the spoke attachment portion of the rim,
  an exterior facing surface that faces in an opposite direction from the rim facing surface,
  a through opening extending between the rim facing surface and the exterior facing surface that is aligned with one of the attachment openings, and
  a tubular section extending through a respective one of the attachment openings of the spoke attachment portion and having internal threads; and
a plurality of adapters having external threads that each mate with the internal threads of the tubular sections of the reinforcement members,
the interior surface being free from contact with the reinforcement member.

8. The bicycle rim according to claim 7, wherein
the annular bridge section is free of openings except for a single valve aperture formed therein.

9. A bicycle rim comprising:
an annular tire attachment portion adapted to have a tire mounted thereon;
an annular spoke attachment portion fixedly coupled with the tire attachment portion, the spoke attachment portion including an interior surface, a pair of annular side sections and an inner annular section to form a substantially U-shaped cross-sectional shape with an annular hollow area, the spoke attachment portion further including a plurality of circumferentially spaced attachment openings with each opening having a central axis extending therethrough;
a plurality of reinforcement members fixedly coupled to the spoke attachment portion at the attachment openings to effectively increase the thickness of the spoke attachment portion of the rim at the attachment openings, each of the reinforcement members having a maximum overlapping dimension overlapping the annular spoke attachment portion as measured from an outer peripheral edge to a respective one of the attachment openings with the maximum overlapping dimension being at least half as large as a maximum transverse dimension of the attachment openings, each of the reinforcement members including:
  a rim facing surface contacting an outer surface of the spoke attachment portion of the rim,
  an exterior facing surface that faces in an opposite direction from the rim facing surface,
  a through opening extending between the rim facing surface and the exterior facing surface that is aligned with one of the attachment openings, and
  a tubular section extending through a respective one of the attachment openings of the spoke attachment portion and having internal threads; and
a plurality of adapters having external threads that each mate with the internal threads of the tubular sections of the reinforcement members,
the interior surface being free from contact with the reinforcement member.

10. The bicycle rim according to claim 9, wherein
each of the reinforcement members is elongated in the circumferential direction of the rim.

11. The bicycle rim according to claim 9, wherein
the rim facing surface of each of the reinforcement members has a contour that corresponds to a contour of the outer surface of the spoke attachment portion.

12. The bicycle rim according to claim 9, wherein
each of the reinforcement members is welded to the spoke attachment portion.

13. The bicycle rim according to claim 9, wherein
each of the reinforcement members is welded around the outer peripheral edge thereof to the spoke attachment portion.

14. The bicycle rim according to claim 9, wherein
the attachment openings are formed in the inner annular section such that the central axes of the attachment openings extend in a substantially radial direction of the rim.

15. A bicycle rim comprising:
an annular tire attachment portion adapted to have a tire mounted thereon, the tire attachment portion including an annular bridge section extending between a pair of annular tire support sections to form a substantially U-shaped cross-sectional shape;
a spoke attachment portion fixedly coupled to the tire attachment portion to form an annular hollow area therebetween, the spoke attachment portion including an interior surface and a plurality of circumferentially spaced attachment openings with each opening having a central axis extending therethrough;
a plurality of reinforcement members fixedly coupled to the spoke attachment portion at the attachment openings to effectively increase the thickness of the spoke attachment portion of the rim at the attachment openings, each of the reinforcement members having a maximum overlapping dimension overlapping the annular spoke attachment portion as measured from an outer peripheral edge to a respective one of the attachment openings with the maximum overlapping dimension being at least half as large as a maximum transverse dimension of the attachment openings, each of the reinforcement members including:
  a rim facing surface contacting an outer surface of the spoke attachment portion of the rim, an exterior facing surface that faces in an opposite direction from the rim facing surface,
a through opening extending between the rim facing surface and the exterior facing surface that is aligned with one of the attachment openings, and
a tubular section extending through a respective one of the attachment openings of the spoke attachment portion and having internal threads; and
a plurality of adapters having external threads that each mate with the internal threads of the tubular sections of the reinforcement members,
the interior surface being free from contact with the reinforcement member.

16. The bicycle rim according to claim 15, wherein the annular bridge section is free of openings except for a single valve aperture formed therein.

17. The bicycle rim according to claim 7, wherein the spoke attachment portion includes a pair of annular side sections and an inner annular section to form a substantially U-shaped cross-sectional shape with an annular hollow area.

18. The bicycle rim according to claim 15, wherein the spoke attachment portion includes a pair of annular side sections and an inner annular section to form a substantially U-shaped cross-sectional shape with an annular hollow area.

19. The bicycle rim according to claim 1, wherein the adapter is configured to be coupled to a head portion of a spoke.

20. The bicycle rim according to claim 7, wherein the adapter is configured to be coupled to a head portion of a spoke.

21. The bicycle rim according to claim 9, wherein the adapter is configured to be coupled to a head portion of a spoke.

22. The bicycle rim according to claim 15, wherein the adapter is configured to be coupled to a head portion of a spoke.

* * * * *